(12) United States Patent
Rosenthal et al.

(10) Patent No.: US 7,620,586 B2
(45) Date of Patent: *Nov. 17, 2009

(54) METHOD AND SYSTEM FOR PROVIDING AUTOMATIC EXECUTION OF TRADING STRATEGIES FOR ELECTRONIC TRADING

(75) Inventors: Leslie Rosenthal, Chicago, IL (US); J. Robert Collins, Burr Ridge, IL (US)

(73) Assignee: Rosenthal Collins Group, LLC, Chicago, IL (US)

( * ) Notice: Subject to any disclaimer, the term of this patent is extended or adjusted under 35 U.S.C. 154(b) by 327 days.

This patent is subject to a terminal disclaimer.

(21) Appl. No.: 11/222,147

(22) Filed: Sep. 8, 2005

(65) Prior Publication Data

US 2006/0080223 A1 Apr. 13, 2006

Related U.S. Application Data

(60) Provisional application No. 60/607,856, filed on Sep. 8, 2004.

(51) Int. Cl.
  *G06Q 40/00* (2006.01)
(52) U.S. Cl. .................................................. 705/37
(58) Field of Classification Search ............... 705/35, 705/37
  See application file for complete search history.

(56) References Cited

U.S. PATENT DOCUMENTS

| | | | |
|---|---|---|---|
| 5,038,284 A | 8/1991 | Kramer | |
| 5,136,501 A | 8/1992 | Silverman | |
| 5,168,446 A | 12/1992 | Wiseman | |
| 5,297,031 A | 3/1994 | Gutterman | |
| 5,412,769 A * | 5/1995 | Maruoka et al. | 345/440 |
| 5,600,346 A | 2/1997 | Kamata et al. | |
| 5,704,050 A | 12/1997 | Redpath | |
| 5,774,877 A | 6/1998 | Patterson et al. | |
| 5,796,402 A | 8/1998 | Ellison-Taylor | |
| 5,799,151 A | 8/1998 | Hoffer | |
| 5,835,090 A | 11/1998 | Clark et al. | |
| 5,873,071 A | 2/1999 | Ferstenberg | |
| 5,915,245 A | 6/1999 | Patterson | |
| 5,924,083 A * | 7/1999 | Silverman et al. | 705/37 |

(Continued)

OTHER PUBLICATIONS

Grossman, Stanford J., Programs Trading and Stock and Futures Price Volitility. The Journal of Futures Markets. Aug. 1988, vol. 8, No. 4, p. 413-419.*

(Continued)

*Primary Examiner*—Susanna M Diaz
*Assistant Examiner*—Kito R Robinson
(74) *Attorney, Agent, or Firm*—Lesavich High - Tech Law Group, P.C.; Stephen Lesavich

(57) ABSTRACT

A method and system for providing automatic execution of trading strategies for electronic trading. A synthetic trading entity is created from two or more actual trading entities. Two or more sets of electronic trading information are received from one or more electronic trading exchanges including trading information for the two or more actual trading entities for the created synthetic trading entity. Two or more electronic trades for the synthetic trading entity are automatically and electronically executed from on the one or more electronic trading exchanges to execute the synthetic trading entity.

16 Claims, 12 Drawing Sheets

U.S. PATENT DOCUMENTS

| | | | |
|---|---|---|---|
| 5,977,973 | A | 11/1999 | Sobeski et al. |
| 6,014,643 | A | 1/2000 | Minton |
| 6,016,483 | A | 1/2000 | Rickard |
| 6,029,146 | A | 2/2000 | Hawkins |
| 6,058,378 | A | 5/2000 | Clark et al. |
| 6,058,379 | A | 5/2000 | Odom |
| 6,209,004 | B1 | 3/2001 | Taylor |
| 6,211,880 | B1 | 4/2001 | Impink |
| 6,317,728 | B1 | 11/2001 | Kane |
| 6,343,278 | B1 | 1/2002 | Jain |
| 6,408,282 | B1 | 6/2002 | Buist |
| 6,418,419 | B1 | 7/2002 | Nieboer |
| 6,421,653 | B1 | 7/2002 | May |
| 6,505,175 | B1 | 1/2003 | Silverman |
| 6,519,574 | B1 | 2/2003 | Wilton |
| H2064 | H | 5/2003 | Buchalter |
| 6,615,188 | B1 | 9/2003 | Breen |
| 6,625,583 | B1 | 9/2003 | Silverman |
| 6,766,304 | B2 | 7/2004 | Kemp |
| 6,772,132 | B1 | 8/2004 | Kemp |
| 6,850,907 | B2 | 2/2005 | Lutnick |
| 6,868,400 | B1 | 3/2005 | Sundaresan |
| 6,892,186 | B1 | 5/2005 | Preist |
| 6,938,011 | B1 | 8/2005 | Kemp |
| 6,963,856 | B2 | 11/2005 | Lutnick |
| 6,993,504 | B1 | 1/2006 | Frisen |
| 6,996,540 | B1 | 2/2006 | May |
| 7,003,486 | B1 | 2/2006 | Condamoor |
| 7,020,626 | B1 * | 3/2006 | Eng et al. ................... 705/27 |
| 7,020,632 | B1 | 3/2006 | Kohls |
| 7,024,632 | B1 | 4/2006 | Stuart |
| 7,080,033 | B2 | 7/2006 | Wilton |
| 7,113,190 | B2 | 9/2006 | Heaton |
| 7,113,924 | B2 | 9/2006 | Fishbain |
| 7,117,450 | B1 | 10/2006 | Chaudhri |
| 7,124,110 | B1 | 10/2006 | Kemp |
| 7,127,424 | B2 | 10/2006 | Kemp |
| 7,130,789 | B2 | 10/2006 | Glodjo |
| 7,146,336 | B2 | 12/2006 | Olsen et al. |
| 7,155,410 | B1 | 12/2006 | Woodmansey |
| 7,177,833 | B1 | 2/2007 | Marynowski |
| 7,184,984 | B2 | 2/2007 | Glodjo |
| 7,212,999 | B2 | 5/2007 | Friesen et al. |
| 7,218,325 | B1 | 5/2007 | Buck |
| 7,228,289 | B2 | 6/2007 | Brumfield et al. |
| 7,243,083 | B2 | 7/2007 | Burns et al. |
| 7,348,981 | B1 | 3/2008 | Buck |
| 7,366,691 | B1 | 4/2008 | Kemp, II |
| 7,373,327 | B1 | 5/2008 | Kemp, II |
| 7,289,268 | B2 | 6/2008 | Kemp, II |
| 7,389,258 | B2 | 6/2008 | Brumfield |
| 7,389,264 | B2 | 6/2008 | Kemp, II |
| 7,392,219 | B2 | 6/2008 | Singer |
| 7,403,921 | B2 | 7/2008 | Tanpoco |
| 7,412,416 | B2 | 8/2008 | Friesen |
| 7,418,422 | B2 | 8/2008 | Burns |
| 7,426,490 | B1 | 9/2008 | Borsand |
| 7,426,491 | B1 | 9/2008 | Singer |
| 7,447,655 | B2 | 11/2008 | Brumfield |
| 7,454,382 | B1 | 11/2008 | Triplett |
| 7,461,026 | B2 | 12/2008 | Schluetter |
| 7,577,602 | B2 * | 8/2009 | Singer ..................... 705/37 |
| 2001/0032097 | A1 | 10/2001 | Levey |
| 2002/0026401 | A1 * | 2/2002 | Hueler ..................... 705/37 |
| 2002/0035534 | A1 | 3/2002 | Buist et al. |
| 2002/0049666 | A1 | 4/2002 | Reuter |
| 2002/0052824 | A1 | 5/2002 | Mahanti |
| 2002/0052836 | A1 | 5/2002 | Galperin et al. |
| 2002/0091624 | A1 | 7/2002 | Glodjo |
| 2002/0138390 | A1 | 9/2002 | May |
| 2002/0156718 | A1 | 10/2002 | Olsen et al. |
| 2002/0169704 | A1 | 11/2002 | Gilbert |
| 2003/0009419 | A1 * | 1/2003 | Chavez et al. .............. 705/38 |
| 2003/0023542 | A1 | 1/2003 | Kemp |
| 2003/0055737 | A1 * | 3/2003 | Pope et al. .................. 705/26 |
| 2003/0083973 | A1 | 5/2003 | Horsfall |
| 2003/0088495 | A1 | 5/2003 | Gilbert et al. |
| 2003/0088509 | A1 | 5/2003 | Wilton |
| 2003/0093351 | A1 | 5/2003 | Sarabanchong |
| 2003/0093360 | A1 | 5/2003 | May |
| 2003/0097325 | A1 | 5/2003 | Friesen |
| 2003/0120591 | A1 * | 6/2003 | Birkhead et al. ............. 705/39 |
| 2003/0126069 | A1 | 7/2003 | Cha |
| 2003/0200167 | A1 | 10/2003 | Kemp |
| 2003/0225648 | A1 * | 12/2003 | Hylton ..................... 705/35 |
| 2003/0233313 | A1 | 12/2003 | Bartolucci |
| 2004/0030635 | A1 | 2/2004 | Marigliano |
| 2004/0049446 | A1 | 3/2004 | Seljeseth |
| 2004/0064395 | A1 | 4/2004 | Mintz |
| 2004/0066414 | A1 | 4/2004 | Czerwinski et al. |
| 2004/0068461 | A1 | 4/2004 | Schluetter |
| 2004/0093300 | A1 | 5/2004 | Burns |
| 2004/0100467 | A1 | 5/2004 | Heaton |
| 2004/0103054 | A1 | 5/2004 | Singer |
| 2004/0117292 | A1 | 6/2004 | Brumfield |
| 2004/0143542 | A1 | 7/2004 | Magill et al. |
| 2004/0148242 | A1 | 7/2004 | Liu |
| 2004/0153391 | A1 | 8/2004 | Burns |
| 2004/0153392 | A1 | 8/2004 | West |
| 2004/0153394 | A1 | 8/2004 | West |
| 2004/0193526 | A1 | 9/2004 | Singer |
| 2004/0210514 | A1 | 10/2004 | Kemp |
| 2004/0210847 | A1 | 10/2004 | Berson et al. |
| 2004/0236669 | A1 | 11/2004 | Horst |
| 2005/0015323 | A1 | 1/2005 | Myr |
| 2005/0027635 | A1 | 2/2005 | Monroe |
| 2005/0075966 | A1 | 4/2005 | Duka |
| 2005/0097026 | A1 | 5/2005 | Morano |
| 2005/0102217 | A1 | 5/2005 | Burns |
| 2005/0125327 | A1 * | 6/2005 | Fishbain ..................... 705/37 |
| 2005/0125328 | A1 | 6/2005 | Schluetter |
| 2005/0144112 | A1 | 6/2005 | Singer |
| 2005/0149429 | A1 | 7/2005 | Kemp |
| 2005/0154668 | A1 | 7/2005 | Burns |
| 2005/0165670 | A1 | 7/2005 | Woodmansey |
| 2005/0187858 | A1 | 8/2005 | Graham |
| 2005/0188329 | A1 | 8/2005 | Cutler et al. |
| 2005/0192887 | A1 | 9/2005 | Triplett |
| 2005/0192920 | A1 | 9/2005 | Hodge et al. |
| 2005/0203825 | A1 | 9/2005 | Angle |
| 2005/0251475 | A1 | 11/2005 | Sato |
| 2005/0256799 | A1 | 11/2005 | Warsaw |
| 2005/0262003 | A1 | 11/2005 | Brumfield |
| 2005/0272812 | A1 | 12/2005 | Pettegrew et al. |
| 2005/0273408 | A1 | 12/2005 | Bandman et al. |
| 2005/0273421 | A1 | 12/2005 | Rosenthal et al. |
| 2005/0278237 | A1 | 12/2005 | Dankovchik et al. |
| 2005/0283422 | A1 | 12/2005 | Myr |
| 2006/0010066 | A1 | 1/2006 | Rosenthal et al. |
| 2006/0015436 | A1 | 1/2006 | Burns |
| 2006/0037038 | A1 | 2/2006 | Buck |
| 2006/0059083 | A1 | 3/2006 | Friesen |
| 2006/0069635 | A1 * | 3/2006 | Ram et al. .................... 705/37 |
| 2006/0080215 | A1 | 4/2006 | Warsaw |
| 2006/0080223 | A1 | 4/2006 | Rosenthal et al. |
| 2006/0085320 | A1 | 4/2006 | Owens |
| 2006/0085741 | A1 | 4/2006 | Weiner |
| 2006/0088614 | A1 | 4/2006 | Pettegrew et al. |
| 2006/0129446 | A1 | 6/2006 | Ruhl et al. |
| 2006/0129474 | A1 | 6/2006 | Kelly |
| 2006/0129475 | A1 | 6/2006 | Badenhorst et al. |
| 2006/0149654 | A1 | 7/2006 | Burns |
| 2006/0155626 | A1 | 7/2006 | Wigzell |
| 2006/0167781 | A1 | 7/2006 | Kemp |

| | | |
|---|---|---|
| 2006/0195387 A1 | 8/2006 | Kemp |
| 2006/0195388 A1 | 8/2006 | Kemp |
| 2006/0195389 A1 | 8/2006 | Kemp |
| 2006/0200405 A1 | 9/2006 | Burns |
| 2006/0229971 A1 | 10/2006 | Kelly |
| 2006/0235787 A1 | 10/2006 | Burns |
| 2006/0247997 A1 | 11/2006 | West |
| 2006/0253371 A1 | 11/2006 | Rutt |
| 2006/0253373 A1 | 11/2006 | Rosenthal et al. |
| 2006/0253377 A1 | 11/2006 | Burns |
| 2006/0259382 A1 | 11/2006 | Kemp |
| 2006/0259383 A1 | 11/2006 | Kemp |
| 2006/0259384 A1 | 11/2006 | Schluetter |
| 2006/0259395 A1 | 11/2006 | Burns |
| 2006/0259396 A1 | 11/2006 | Burns |
| 2006/0259397 A1 | 11/2006 | Schluetter |
| 2006/0259398 A1 | 11/2006 | Singer |
| 2006/0259399 A1 | 11/2006 | Mintz |
| 2006/0259400 A1 | 11/2006 | Monroe |
| 2006/0259401 A1 | 11/2006 | West |
| 2006/0259402 A1 | 11/2006 | West |
| 2006/0259403 A1 | 11/2006 | Monroe |
| 2006/0259404 A1 | 11/2006 | Brumfield |
| 2006/0259405 A1 | 11/2006 | Friesen |
| 2006/0259406 A1 | 11/2006 | Kemp |
| 2006/0259407 A1 * | 11/2006 | Rosenthal et al. ............. 705/37 |
| 2006/0259409 A1 | 11/2006 | Burns |
| 2006/0259410 A1 | 11/2006 | Friesen |
| 2006/0259411 A1 | 11/2006 | Burns |
| 2006/0259412 A1 | 11/2006 | Kemp |
| 2006/0259413 A1 | 11/2006 | Friesen |
| 2006/0259414 A1 | 11/2006 | Singer |
| 2006/0265239 A1 | 11/2006 | Schluetter |
| 2006/0265240 A1 | 11/2006 | Schluetter |
| 2006/0265303 A1 | 11/2006 | Kemp |
| 2006/0265304 A1 | 11/2006 | Brumfield |
| 2006/0265305 A1 | 11/2006 | Schluetter |
| 2006/0265314 A1 | 11/2006 | Singer |
| 2006/0265315 A1 | 11/2006 | Friesen |
| 2006/0265316 A1 | 11/2006 | Brumfield |
| 2006/0265317 A1 | 11/2006 | Duquette |
| 2006/0265318 A1 | 11/2006 | Friesen |
| 2006/0265319 A1 | 11/2006 | Friesen |
| 2006/0265320 A1 | 11/2006 | Duquette |
| 2006/0265321 A1 | 11/2006 | Brumfield |
| 2006/0265322 A1 | 11/2006 | Burns |
| 2006/0265651 A1 | 11/2006 | Buck |
| 2006/0271468 A1 | 11/2006 | Rosenthal et al. |
| 2006/0271475 A1 | 11/2006 | Brumfield |
| 2006/0277136 A1 | 12/2006 | O'Connor |
| 2006/0287944 A1 | 12/2006 | Fishbain |
| 2006/0292547 A1 | 12/2006 | Pettegrew et al. |
| 2006/0293997 A1 | 12/2006 | Tanpoco |
| 2006/0293999 A1 | 12/2006 | Tanpoco |
| 2007/0038543 A1 | 2/2007 | Weinstein |
| 2007/0038549 A1 | 2/2007 | Janowski |
| 2007/0038554 A1 | 2/2007 | Kemp |
| 2007/0038555 A1 | 2/2007 | Kemp |
| 2007/0038556 A1 | 2/2007 | Kemp |
| 2007/0038557 A1 | 2/2007 | Kemp |
| 2007/0043647 A1 | 2/2007 | Bickford |
| 2007/0078749 A1 | 4/2007 | Burns |
| 2007/0078752 A1 | 4/2007 | Burns |
| 2007/0083458 A1 | 4/2007 | Rosenthal et al. |
| 2007/0088658 A1 | 4/2007 | Rosenthal et al. |
| 2007/0100735 A1 | 5/2007 | Kemp |
| 2007/0100736 A1 | 5/2007 | Singer |
| 2007/0106590 A1 | 5/2007 | Triplett |
| 2007/0112665 A1 | 5/2007 | Mackey et al. |
| 2007/0156565 A1 | 7/2007 | Singer |
| 2007/0156570 A1 | 7/2007 | Singer |
| 2007/0226126 A1 | 9/2007 | Kirwin et al. |
| 2007/0226127 A1 | 9/2007 | Kirwin et al. |
| 2007/0294157 A1 | 12/2007 | Singla et al. |
| 2008/0059846 A1 | 3/2008 | Rosenthal et al. |
| 2008/0097887 A1 | 4/2008 | Duquette |
| 2008/0129735 A1 | 6/2008 | Buck |
| 2008/0154764 A1 | 6/2008 | Levine et al. |
| 2008/0162324 A1 | 7/2008 | West |
| 2008/0162333 A1 | 7/2008 | Kemp |
| 2008/0162378 A1 | 7/2008 | Levine et al. |
| 2008/0243709 A1 | 10/2008 | Mintz |
| 2008/0243710 A1 | 10/2008 | Borts |
| 2008/0281669 A1 | 11/2008 | Pratt |

OTHER PUBLICATIONS

GL Trade, Liffe Connect for Futures, User Guide, V 4.50 Beta, Jan. 1999.

System for Buying and Selling Futures and Options Transaction Terminal Operational Guidelines, Tokyo Stock Exchange, 1999.

Static Price Axis for Electronic Trading, Wit Capital Group, Digital Stock Market, Graphical User Interface Negotiations Design Document, Oct. 13, 1998, pp. 63-34.

Electronic Trading platforms Special Report, Jeremy Carter, Risk Magazine, Nov. 1999.

Memorandum Opinion and Order of Federal Judge James B. Moran, *Trading Technologies International Inc.* v. *eSpeed Inc., eSpeed International Ltd.*, and *Ecco Ware, Ltd.* Jun. 20, 2007 (N.D. Ill) including constructions for U.S. Patent Nos. 6,766,304 and 6,882,132.

Partial PCT Search Report PCT/US2006/043,726 WO 2007/056,553.

Partial PCT Search Report PCT/US2006/021,052 WO 2006/130,650.

International Search Report for PCT/US2005/039,563.

International Search Report for PCT/US2005/024,590.

International Search Report for PCT/US2005/020,035.

Jun. 17, 2008, Partial PCT Search Report—PCT/US2006/038,612.

Jun. 11, 2008, Partial PCT Search Report—PCT/US2006/016,792.

Aug. 8, 2008, Partial PCT Search Report—PCT/US2005/032,189.

* cited by examiner

METHOD AND SYSTEM FOR PROVIDING AUTOMATIC EXECUTION OF TRADING STRATEGIES FOR ELECTRONIC TRADING

CROSS REFERENCES TO RELATED APPLICATIONS

This applications claims priority to U.S. Provisional Patent Application 60/607,856, filed Sep. 8, 2004, the contents of which are incorporated by reference.

FIELD OF THE INVENTION

This invention relates to providing electronic information over a computer network for electronic trading. More specifically, it relates to a method and system for providing automatic execution of trading strategies for electronic trading of actual and synthetic trading entities.

BACKGROUND OF THE INVENTION

The trading of stocks, bonds and other financial instruments over computer networks such as the Internet has become a very common activity. In many countries of the world, such stocks, bonds and other financial instruments are traded exclusively over computer networks, completely replacing prior trading systems such as "open outcry" trading in trading pits.

Trading of stocks, bonds, etc. typically requires multiple types of associated electronic information. For example, to trade stocks electronically an electronic trader typically would like to know an asking price for a stock, a current bid price for a stock, a bid quantity, an asking quantity, current information about the company the trader is trading such as profit/loss information, a current corporate forecast, current corporate earnings, etc.

The multiple types of associated electronic information have to be supplied in real-time to allow the electronic trader to make the appropriate decisions. Such electronic information is typically displayed in multiple windows on a display screen.

For an electronic trader to be successful, the trader typically develops trading strategies. For example a trading strategy may include executing a trade based on a desired ratio between two trading instruments. As another example, a trading strategy may include executing a trade based on a basis level for a trading instrument.

There are several problems with using manual trading strategies on electronic trading systems. One problem is that a trader will typically create his/her own trading strategies using disjunct or proprietary tools. For example, a trade may implement his/her own trading strategy in a spreadsheet and manually enter and update current market values of trading instruments. The trader then must take additional actions to implement his/her trading strategy based on data form the spreadsheet.

Another problem is that some electronic trading systems allow traders to enter certain data to provide automatic notification of events that are related to a trader's trading strategy (e.g., a certain buy price, a sell price, a ratio, etc.). However, then a trader must still take manual actions to execute an electronic trade such as clicking a mouse, making a keyboard input, etc.).

Another problem is that many traders execute trades across many different markets and several different electronic exchanges. Such trading typically leads a trader to manual methods to execute a desired trading strategy.

Another problem is the display of spreads and options. Many GUIs do not display spreads and options.

Another problem is that most electronic trading systems do not allow creation or trading of synthetic contracts or synthetic instruments. As is known in the art, a "synthetic" instrument or contract includes an instrument or contract that does not really exist on any electronic trading exchange.

There have been attempts to solve some of the problems with GUIs used for electronic trading. For example, U.S. Pat. No. 6,772,132 entitled "Click based trading with intuitive grid display of market depth" that issued to Kemp et al. teaches "A method and system for reducing the time it takes for a trader to place a trade when electronically trading on an exchange, thus increasing the likelihood that the trader will have orders filled at desirable prices and quantities. The "Mercury" display and trading method of the present invention ensure fast and accurate execution of trades by displaying market depth on a vertical or horizontal plane, which fluctuates logically up or down, left or right across the plane as the market prices fluctuates. This allows the trader to trade quickly and efficiently."

U.S. Pat. No. 6,766,304 entitled "Click based trading with intuitive grid display of market depth" that issued to Kemp et al. teaches "A method and system for reducing the time it takes for a trader to place a trade when electronically trading on an exchange, thus increasing the likelihood that the trader will have orders filled at desirable prices and quantities. The "Mercury" display and trading method of the present invention ensure fast and accurate execution of trades by displaying market depth on a vertical or horizontal plane, which fluctuates logically up or down, left or right across the plane as the market prices fluctuates. This allows the trader to trade quickly and efficiently."

U.S. Pat. No. 6,408,282 entitled "System and method for conducting securities transactions over a computer network" that issued to Buist teaches "The system and method of the preferred embodiment supports trading of securities over the Internet both on national exchanges and outside the national exchanges. The preferred embodiment supports an improved human interface and a continuous display of real-time stock quotes on the user's computer screen. The ergonomic graphical user interface (GUI) of the preferred embodiment includes several functional benefits in comparison with existing on-line consumer trading systems. In the preferred embodiment, the users are subscribers to a securities trading service offered over the Internet. Preferably, each subscriber to this service is simultaneously connected from his own computer to a first system which provides user-to-user trading capabilities and to a second system which is a broker/dealer system of his/her choice. The system providing the user-to-user trading services preferably includes a root server and a hierarchical network of replicated servers supporting replicated databases. The user-to-user system provides real-time continuously updated stock information and facilitates user-to-user trades that have been approved by the broker/dealer systems with which it interacts. Users of the preferred system can trade securities with other users of the system. As part of this user-to-user trading, a user can accept a buy or sell offer at the terms offered or he can initiate a counteroffer and negotiate a trade."

U.S. Pat. No. 5,297,031 entitled "Method and apparatus for order management by market brokers" that issued to Gutterman et al. teaches "There is provided a broker workstation for managing orders in a market for trading commodities, securities, securities options, futures contracts and futures options and other items including: a device for selectively displaying order information; a computer for receiving the orders and for controlling the displaying device; and a device for entering the orders into the computer; wherein the displaying device comprises a device for displaying selected order information about each incoming order, a device for displaying a representation of an order deck and a device for displaying a total of market orders. In another aspect of the invention, there is provided in a workstation having a computer, a device for entering order information into the computer and a device for displaying the order information entered, a method for managing orders in a market for trading commodities, securities, securities options, futures contracts and futures options and the like comprising the steps of: selectively displaying order information incoming to the workstation; accepting or rejecting orders corresponding to the incoming order information displayed; displaying accepted order information in a representation of a broker deck; and selectively displaying a total of orders at the market price."

Thus, it is desirable to solve some of the problems associated with implementing actual and synthetic trading strategies using electronic trading systems.

SUMMARY OF THE INVENTION

In accordance with preferred embodiments of the present invention, some of the problems associated with providing trading strategies for electronic trading systems are overcome. A method and system for providing automatic execution of trading strategies for electronic trading is provided.

A method and system for providing automatic execution of trading strategies for electronic trading. A synthetic trading entity is created from two or more actual trading entities. Two or more sets of electronic trading information are received from one or more electronic trading exchanges including trading information for the two or more actual trading entities for the created synthetic trading entity. Two or more electronic trades for the synthetic trading entity are automatically and electronically executed from on the one or more electronic trading exchanges to execute the synthetic trading entity.

The foregoing and other features and advantages of preferred embodiments of the present invention is more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF THE INVENTION

Figure 1:
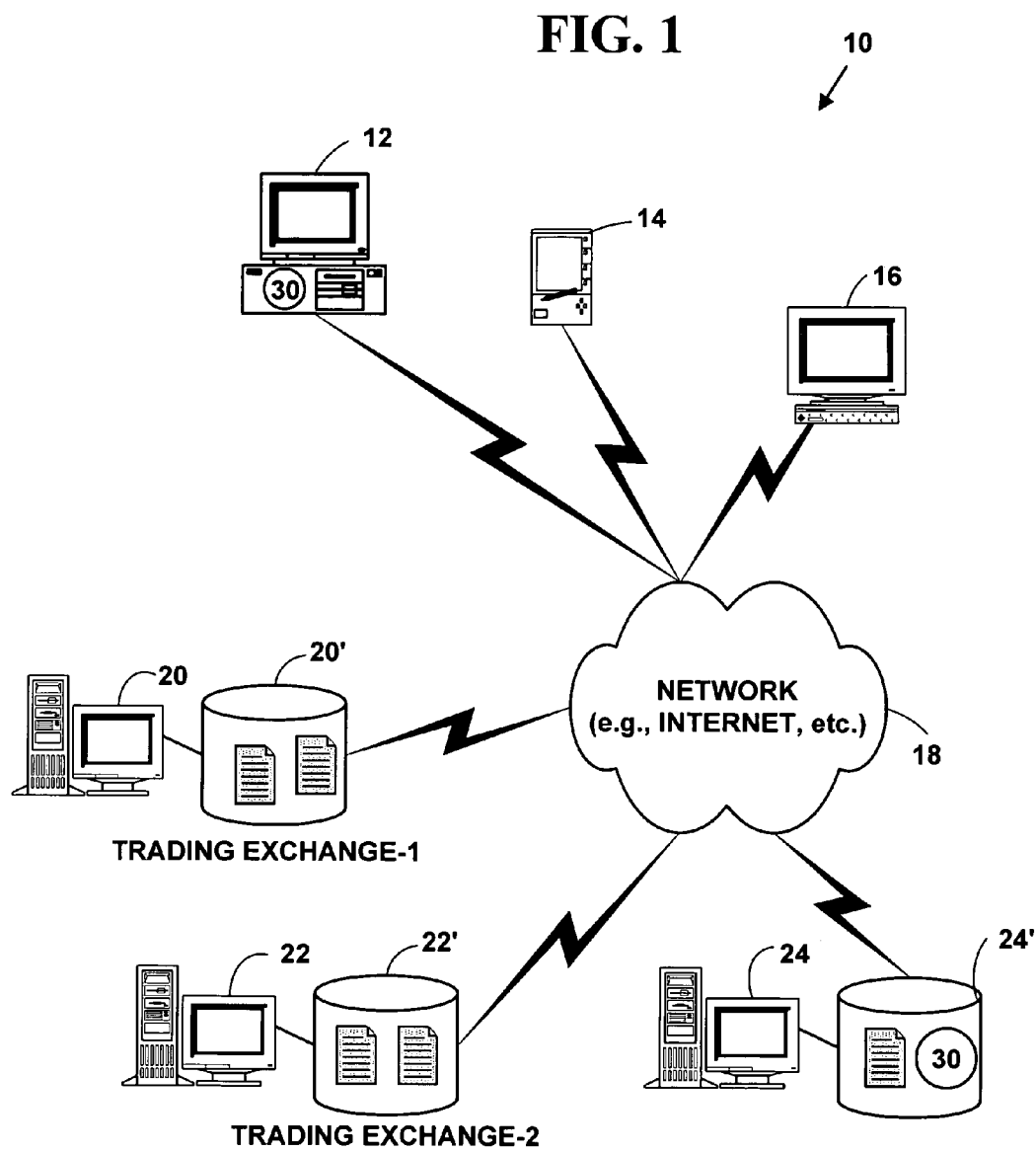
FIG. 1 is a block diagram illustrating an exemplary electronic trading system.

FIG. 1 is a block diagram illustrating an exemplary electronic trading system 10. The exemplary electronic information updating system 10 includes, but is not limited to, one or more target devices 12, 14, 16 (only three of which are illustrated). However, the present invention is not limited to these target electronic devices and more, fewer or others types of target electronic devices can also be used.

The target devices 12, 14, 16 are in communications with a communications network 18. The communications includes, but is not limited to, communications over a wire connected to the target network devices, wireless communications, and other types of communications using one or more communications and/or networking protocols.

Plural server devices 20, 22, 24 (only three of which are illustrated) include one or more associated databases 20', 22', 24'. The plural network devices 20, 22, 24 are in communications with the one or more target devices 12, 14, 16 via the communications network 18. The plural server devices 20, 22, 24, include, but are not limited to, World Wide Web servers, Internet servers, file servers, other types of electronic information servers, and other types of server network devices (e.g., edge servers, firewalls, routers, gateways, etc.).

The plural server devices 20, 22, 24 include, but are not limited to, servers used for electronic trading exchanges, servers for electronic trading brokers, servers for electronic trading information providers, etc.

The one or more target devices 12, 14, 16 may be replaced with other types of devices including, but not limited to, client terminals in communications with one or more servers, or with personal digital/data assistants (PDA), laptop computers, mobile computers, Internet appliances, two-way pagers, mobile phones, or other similar desktop, mobile or hand-held electronic devices. Other or equivalent devices can also be used to practice the invention.

The communications network 18 includes, but is not limited to, the Internet, an intranet, a wired Local Area Network (LAN), a wireless LAN (WiLAN), a Wide Area Network (WAN), a Metropolitan Area Network (MAN), a Public Switched Telephone Network (PSTN) and other types of communications networks 18.

The communications network 18 may include one or more gateways, routers, bridges, switches. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments. Switches typically operate at the data link layer and sometimes the network layer and therefore support virtually any packet protocol.

The communications network 18 may include one or more servers and one or more web-sites accessible by users to send and receive information useable by the one or more computers 12. The one or more servers, may also include one or more associated databases for storing electronic information.

The communications network 18 includes, but is not limited to, data networks using the Transmission Control Protocol (TCP), User Datagram Protocol (UDP), Internet Protocol (IP) and other data protocols.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is known in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 18 and the present invention is not limited to TCP/UDP/IP.

Exemplary Electronic Trading Display System

Figure 2:
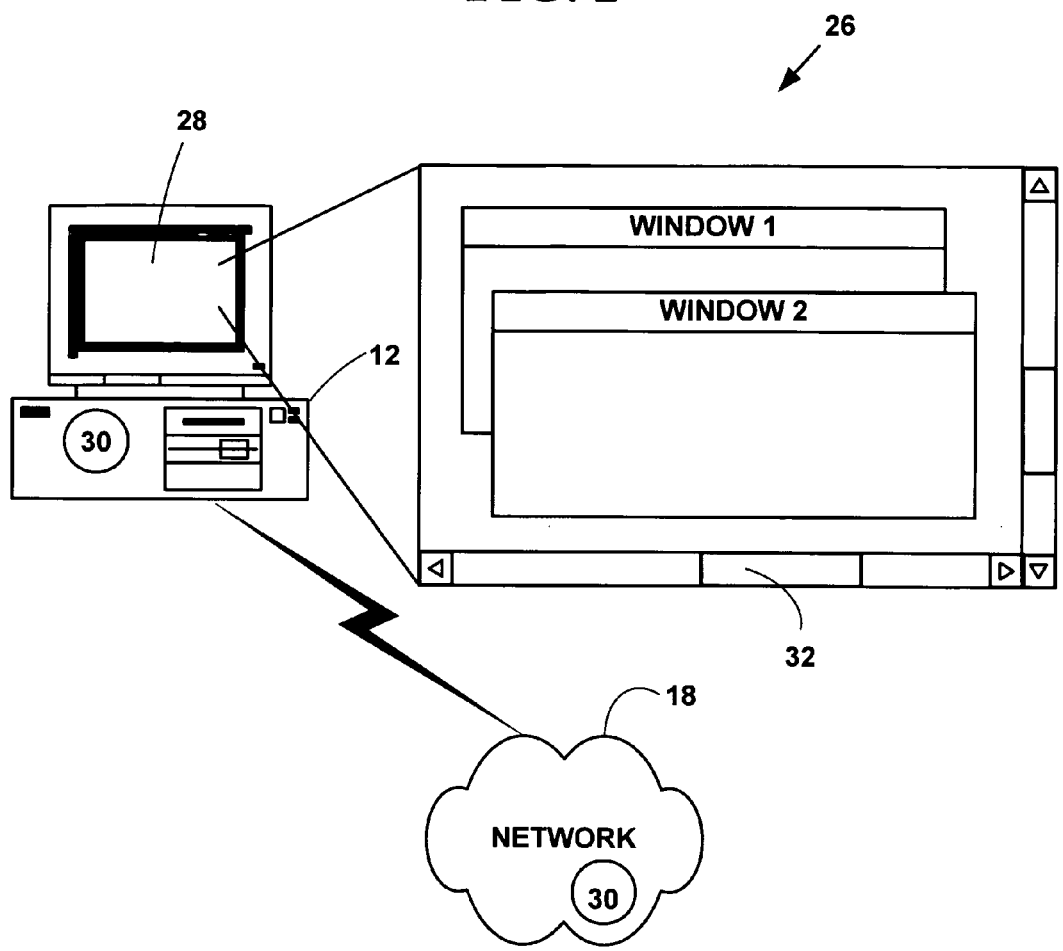
FIG. 2 is a block diagram illustrating an exemplary electronic trading display system.

FIG. 2 is a block diagram illustrating an exemplary electronic trading display system 26. The exemplary electronic trading system display system includes, but is not limited to a target device (e.g., 12) with a display 28. The target device includes an application 30 that presents a graphical user interface (GUI) 32 on the display 28. The GUI 32 presents a multi-window interface to a user.

In one embodiment of the invention, the application 30 is a software application. However, the present invention is not limited to this embodiment and the application 30 can use firmware, hardware or a combination thereof.

An operating environment for the devices of the electronic trading system 10 and electronic trading display system 26 include a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It is appreciated that acts and symbolically represented operations or instructions include the manipulation of electrical signals by the CPU or processor. An electrical system represents data bits which cause a resulting transformation or reduction of the electrical signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Automatically Implementing Trading Strategies for Electronic Trading

Figure 3:
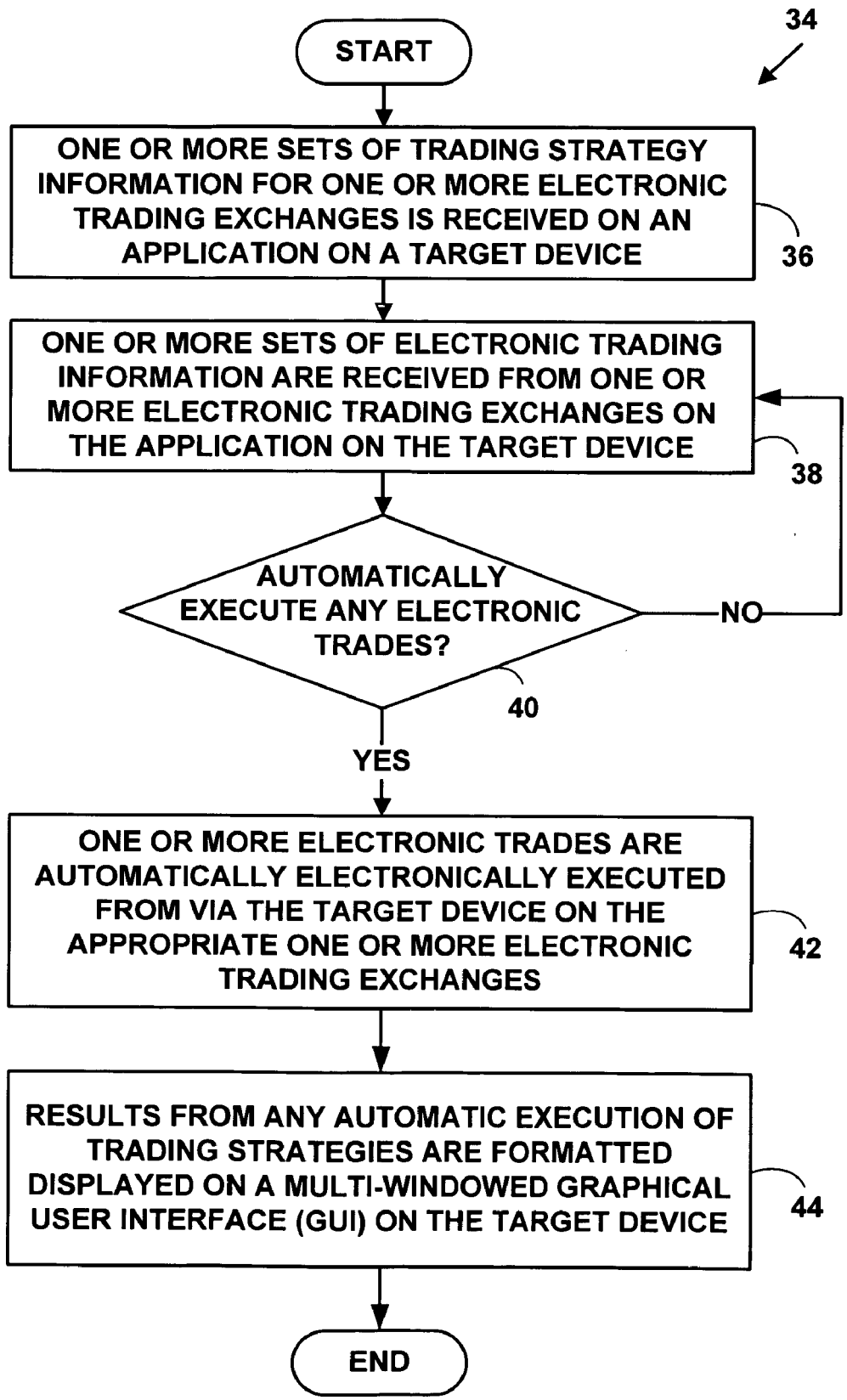
FIG. 3 is a flow diagram illustrating a method for displaying electronic information for electronic trading.

FIG. 3 is a flow diagram illustrating a Method 34 for automatically implementing trading strategies for electronic trading. At Step 36, one or more sets of trading strategy information for one or more electronic trading exchanges are received on an application 30 on a target device 12, 14, 16. At Step 38, one or more sets of electronic trading information are received from one or more electronic trading exchanges on the application 30 on the target device 12, 14, 16. At Step 40, a test is conducted to determine if any of the one or more sets of electronic trading information includes electronic information for automatically executing an electronic trade based on the one more sets of received trading strategy information. If any of the electronic trading information includes any information for automatically executing one or more electronic trades based on the one more sets of receiving trading strategy information, at Step 42, the one or more electronic trades are automatically electronically executed from via the target device 12, 14, 16 on the appropriate electronic trading exchange. At Step 44, Results from any automatic execution of trading strategies are formatted and displayed on a multi-windowed graphical user interface (GUI) 32 on the target device 12, 14, 16.

Method 34 is illustrated with an exemplary embodiment. However, the invention is not limited to this embodiment and other embodiments can also be used to practice the invention.

In such an exemplary embodiment at Step 36, one or more sets of trading strategy information for one or more electronic trading exchanges is received on an application 30 on a target device 12, 14, 16.

The application 30 allows traders to quickly enter in strategy orders in cash and futures contracts and other types of financial instruments that are traded over one or more electronic trading electronic exchanges. The application 30 also allows traders to quickly enter in trading strategies for cash, futures, swap, basis, duration contracts and other types of financial instruments traded via one or more electronic exchanges. The application 30 also provides traders with the ability to input data to automatically initialize ratios, and automatically analyze trading strategies and risk over multiple electronic exchanges. The application 30 allows traders to quickly enter in trading strategies using a minimal number of hand movements (e.g., mouse clicks, keyboard key strokes, etc.).

At Step 40, a test is conducted to determine if any of the one or more sets of electronic trading information includes electronic information for automatically executing an electronic trade based on the one more sets of received trading strategy information. For example, a desired buy or sell number, a desired ratio, a desired basis level, etc.

If any of the electronic trading information includes any information for automatically executing one or more electronic trades based on the one more sets of receiving trading strategy information, at Step 42 the one or more electronic trades are automatically electronically executed from via the target device 12, 14, 16 on the appropriate electronic trading exchange.

In addition to ease of entry, the application 30 provides smart order entry. It does this by passively and actively examining one or more desired electronic trading changes for potential trading executions. This smart order entry provides traders with a unique advantage over traditional order enter systems which do not actively examine market conditions for favorable trading opportunities across multiple markets or multiple electronic trading exchanges.

The application 30 examines multiple electronic trading exchanges for desired trading opportunities based on the received one or more sets of trading strategies. The application 30 also automatically examines cost of carry, execution fees, and market price to automatically determine lowest cost trade. When more than one electronic trading exchange is being consider, the application 30 automatically determines one or more appropriate trades to automatically execute at a comparable price. The application 30 also examines the rate of execution and directs orders to the electronic trading exchange, for example, with the least cost and/or fastest execution rate.

In one embodiment the one or more sets of electronic trading strategy includes a pre-determined trading strategy created by a trader, if-then trading strategies, one-cancels-other (OCO) trading strategies and electronic trading strategies for synthetic instruments or synthetic contracts, or execution of strategies based on previously executed orders.

As is known in the art, the pre-determined strategy trading strategy is a pre-determined trading strategy developed by a trader to apply to a desired market (e.g., cash, futures, stocks, bonds, options, spreads etc.)

As is known in the art, a "synthetic" instrument or contract includes an instrument or contract that does not really exist on any electronic trading exchange. A synthetic can be made up of one, or several actual contracts that trade on an exchange or multiple exchanges. For example, a synthetic contract may include automatically selling a call and buying a put for two actual futures contracts. Such a synthetic contract does not exist on any trading exchange but is desirable to a selected group of traders.

As is known in the art, an API is set of routines used by an application program to direct the performance of actions by a target device. In the present invention, the application 30 is interfaced to one or more API.

In another embodiment, the application 30 is directly interfaced to a fixed or dynamic connection to one or more electronic trading exchanges without using an API.

In one exemplary embodiment of the invention, the application 30 interfaces with a Client API provided by Professional Automated Trading Systems (PATS) of London, England, or Trading Technologies, Inc. (TT) of Chicago, Ill. GL Multi-media of Paris, France and others. These APIs are intermediate APIs between the Application and other APIs provided by electronic trading exchanges. However, the present invention is not limited to such an embodiment and other APIs and other fixed or dynamic connections can also be used to practice the invention.

The application 30 presents a user a multi-windowed GUI 32 that implements the functionality exposed through API provided by electronic trading exchanges. The application 30 allows the user to subscribe to and receive real-time market data. Additionally, the application 30 allows the user to enter futures orders, cash orders, and other types of financial products orders to all supported exchanges and receive real-time order status updates. The application 30 supports at least two methods of order entry; Order Ticket and Aggregated Book View (ABV).

The application 30 provides flexibility to the user to configure the display of electronic information on the GUI 32. The application 30 and the GUI are now described in further detail.

Figure 4:
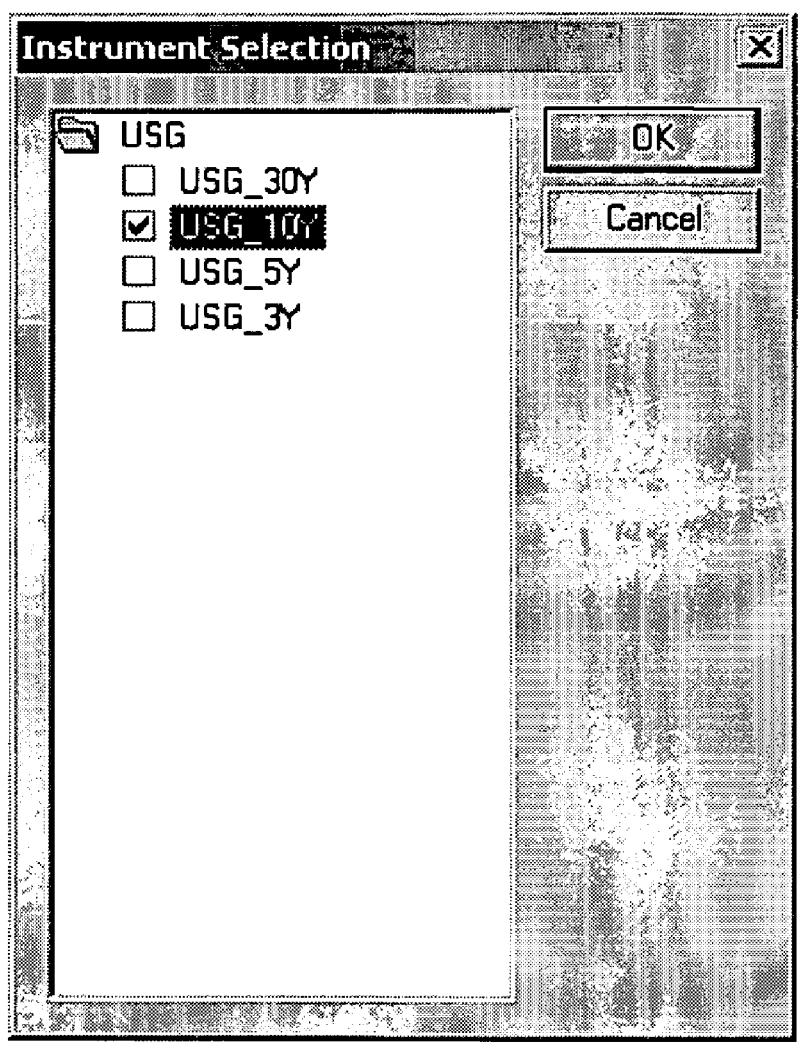
FIG. 4 is a block diagram of a screen shot of a graphical window produced by application that allows a trader to enter a trading strategy.

FIG. 4 is a block diagram of a screen shot 46 of a graphical window produced by application 30 that allows a trader to enter a trading strategy. FIG. 4 illustrates a window used to enter a trading strategy to enter a United States Government (USG) ten year treasury note.

Figure 5:
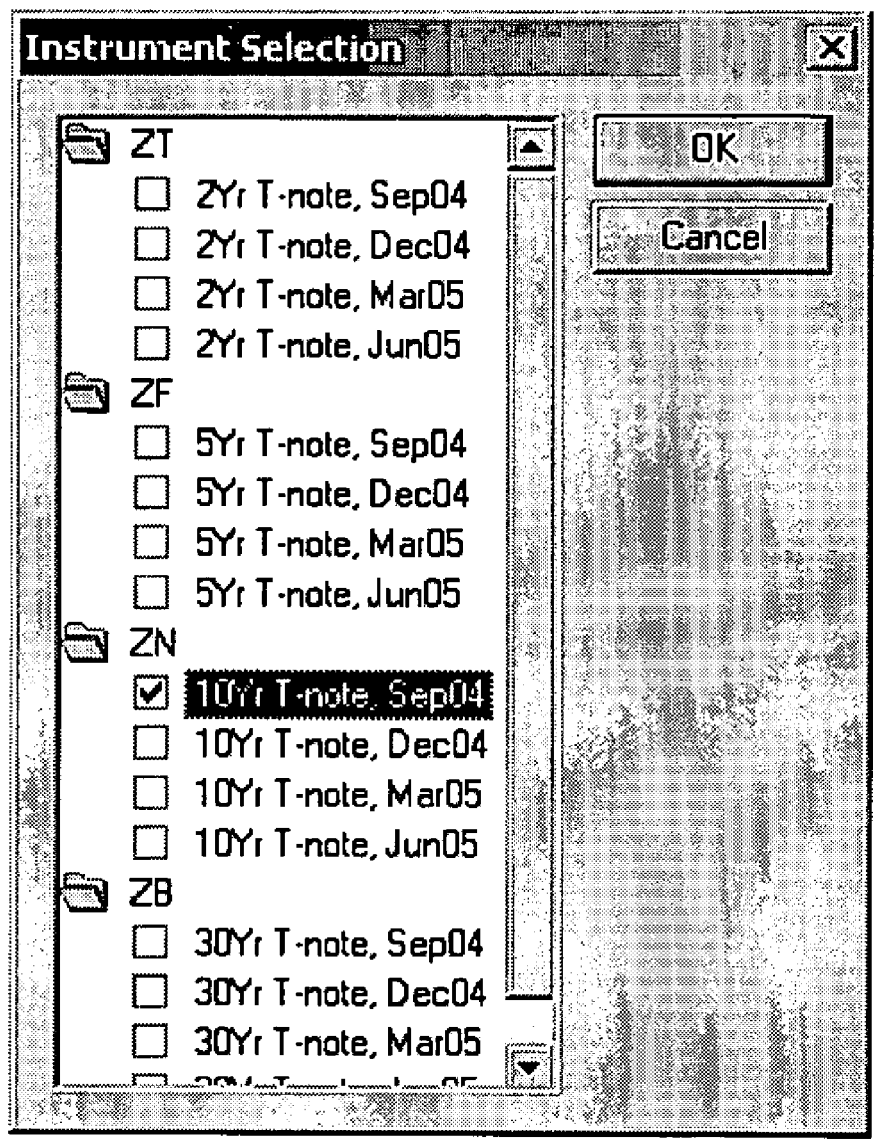
FIG. 5 is a block diagram of a screen shot of a graphical window produced by application that allows a trader to enter a trading strategy.

FIG. 5 is a block diagram of a screen shot 48 of a graphical window produced by application 30 that allows a trader to enter a trading strategy. FIG. 5 illustrates a window used to select options for a trading strategy to enter a United States Government (USG) ten year treasury note.

Figure 6:
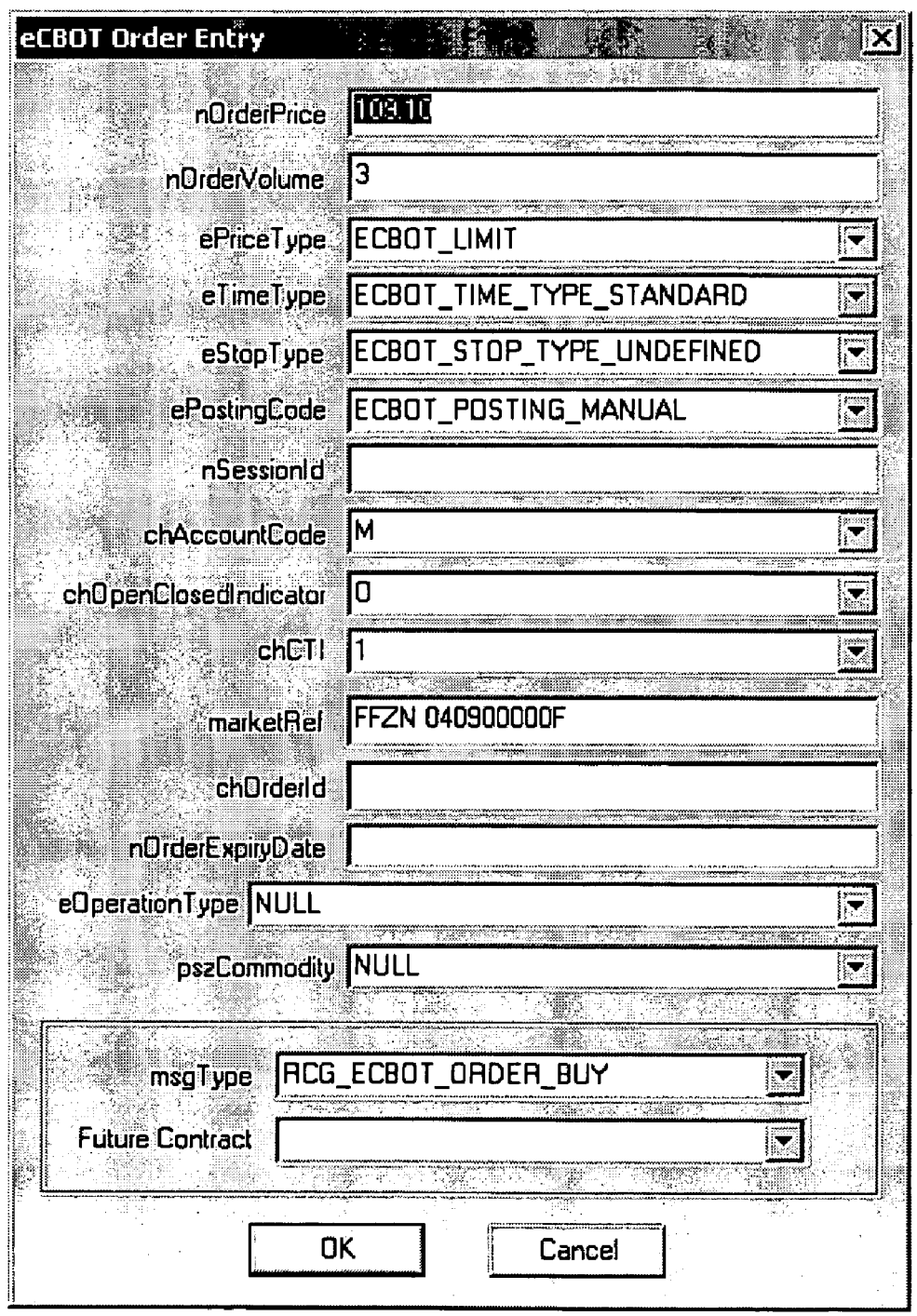
FIG. 6 is a block diagram of a screen shot of a graphical window produced by application that allows a trader to enter a trading strategy.

FIG. 6 is a block diagram of a screen shot 50 of a graphical window produced by application 30 that allows a trader to enter a trading strategy. FIG. 6 illustrates a window used to select options for automatically entering an order to buy or sell a financial instrument based on an entered trading strategy.

Figure 7:
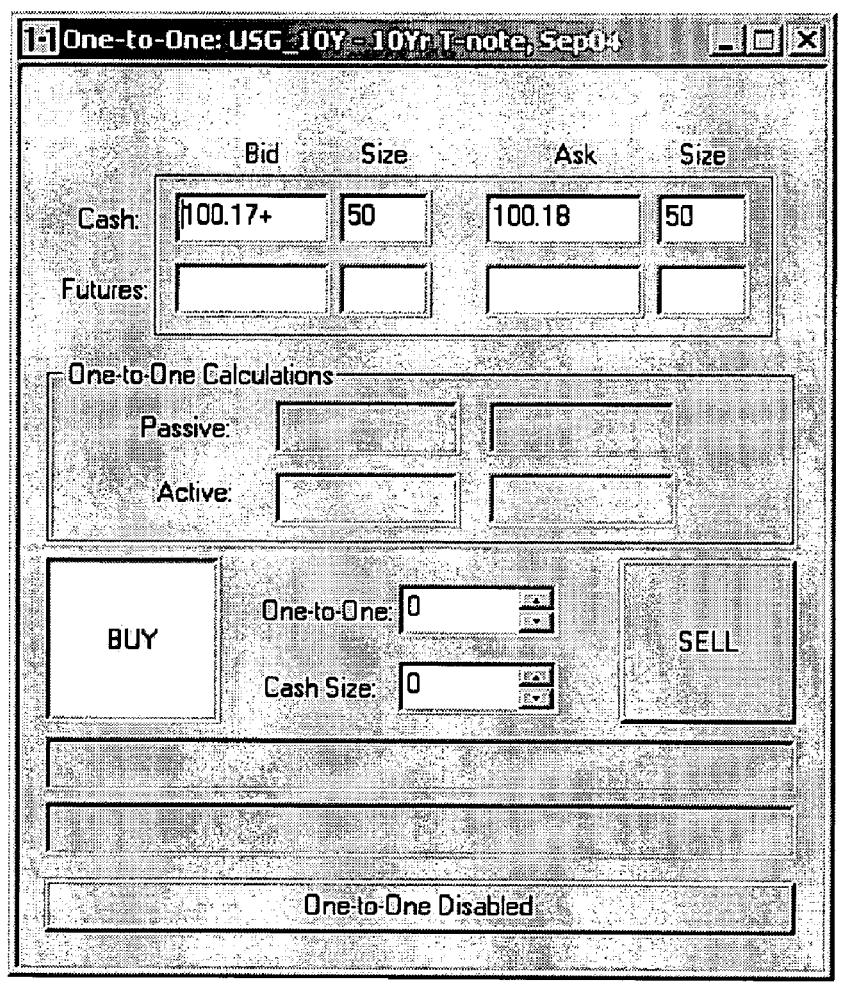
FIG. 7 is a block diagram of a screen shot of a graphical window produced by application that allows a trader to enter a trading strategy.

FIG. 7 is a block diagram of a screen shot 52 of a graphical window produced by application 30 that allows a trader to enter a trading strategy. FIG. 7 illustrates a window used to select and display options for a trading strategy.

FIGS. 4-7 represent exemplary screen shot only and only illustrate one entering a trading strategy for one type of financial instrument. However, FIGS. 4-7 are exemplary only and are not meant to limit the scope of the invention.

Specialized Order Functionality

The application 30 also provides specialized order functionality for actual and synthetic entities. This functionality is available to the user wherever actual or synthetic orders can be entered. The user creates one-cancels-other (OCO) order pairs. An OCO order is one that allows the user to have two working orders in the market at once With the execution of one order the other is canceled. The user can construct an OCO pair across different instruments traded on a single electronic exchange. The user can construct an OCO pair across different instruments on two electronic trading exchanges. The user can construct an OCO pair combining orders of any order type that is supported by the exchange (or supported synthetic order types).

The user cancels OCO orders before exiting the application 30. If the user has any open OCO's upon logoff, the GUI 32 warns the user that the orders will be cancelled and allow the user to cancel the logoff if desired. By default, entering a quantity for the OCO enters that same quantity for both sides of the OCO.

A complete fill of one order cancels the other order. If there is a partial fill on one leg of the OCO, the other side of the OCO is reduced by the amount that was filled. This functionality will only occur if both legs of the OCO are entered with the same quantity. The user has the ability to turn off this functionality, so that the order quantities don't automatically decrement and the orders are canceled only when one order is completely filled. If the user enters different quantities, this functionality are automatically turned off and disabled.

The user can cancel individual orders of the pair, leaving the remaining order in the market. The user can cancel both orders in the pair simultaneously. The user can change the price for an individual order of the pair. The user can create a profit/loss bracket order pair. A Profit/Loss bracket is a specific case of an OCO order pair. This order pair consists of a limit order to establish a profit and a stop loss order to limit loss. The stop loss portion of the bracket should be able to be a "trailing stop." The use is able to create a profit/loss bracket around an existing position. The user is able to create a profit/loss bracket around a fill. The use can create a profit/loss bracket around an order in the filled state.

The user can create trailing stop orders. A trailing stop is an order that tracks a price of the instrument and adjusts the stop trigger price in accordance with a predefined rule (i.e., stop trigger is changed when the market changes a certain number of ticks).

Trailing stop orders can be either of type stop or stop limit. For stop limit orders, the limit price will be changed such that it keeps the same differential from the stop trigger price. In order to set up the trailing stop rule, the user must enter: the number of ticks that the market must change before the stop trigger price should be adjusted. The number of ticks that the stop trigger price should be adjusted when an adjustment is warranted. A trailing stop order is purely synthetic.

The stop order should only be known to the client until it is actually triggered. At that time either a market order (in the case of an order type of stop) or a limit order (in the case of a stop limit order) will be entered into the market. A trailing stop only adjusts the stop trigger price in the profitable direction of the trade. A trailing stop order to sell does not adjust the stop trigger price to a value less than the initial trigger value. A trailing stop order to sell only increases the stop trigger price. A trailing stop order to sell only adjusts the stop trigger price when new high prices are traded in the instrument. This will prevent adjusting the stop trigger price if the instrument price retraces a profitable move but does not trigger the stop.

A trailing stop order to buy does not adjust the trigger price to a value greater than the initial trigger value. A trailing stop order to buy only decreases the stop price. A trailing stop order to buy must adjusts the trigger price when new low prices are traded in the instrument. This will prevent adjusting the stop trigger price if the instrument price retraces a profitable move but does not trigger the stop. Trailing stops are only valid while the user is logged into the application 30. Application 30 exit will have the effect of the trailing stop not being in the market. On application exit, if the user has trailing stops entered, the user will be warned that the stop will not be worked while the application is closed.

The user is to choose to save trailing stops. On application 30 launch, the user is advised of any saved trailing stops and given the opportunity to reenter them.

The user is able to create parked orders. A parked order is an order that is created by the user but not submitted to the market. The user is able to release a parked order. Releasing a parked order submits it to the market. The user can change a working order to a parked order. This sends a cancel to the exchange. On receipt of the cancel acknowledgement, the application 30 changes the order state to indicate that the order is parked. Parked orders are saved on application exit. Parked orders are restored on application 30 launch.

If-Then Strategies

The user can create an "If-Then Strategy." With an If Then Strategy, an order is entered into the market. Upon receipt of a fill acknowledgement for the order, one or more other orders are automatically entered by the application 30 based on the If-Then strategy. Typically, the orders that are entered with If-Then Strategy will be orders to manage profit and loss expectations for the fill that was received on the original order. The user can create an If-Then strategy where on the receipt of the acknowledgement of an order fill, a profit/loss bracket is entered around the fill price for the filled quantity. The user can create an If-Then strategy where on the receipt of the acknowledgement of an order fill, a stop or stop limit order is entered at an offset from the fill price for the quantity of the fill. The user can create an If-Then strategy where on the receipt of the acknowledgement of an order fill, a trailing stop order is entered at an offset from the fill price for the quantity of the fill. The user can create an If-Then strategy where on the receipt of the acknowledgement of an order fill, a limit order is entered at an offset from the fill price for the quantity of the fill. The user can create an If-Then strategy where on the receipt of the acknowledgement of an order fill, an OCO order pair is entered.

Automatically Executing Synthetic Trading Entities

Figure 8:
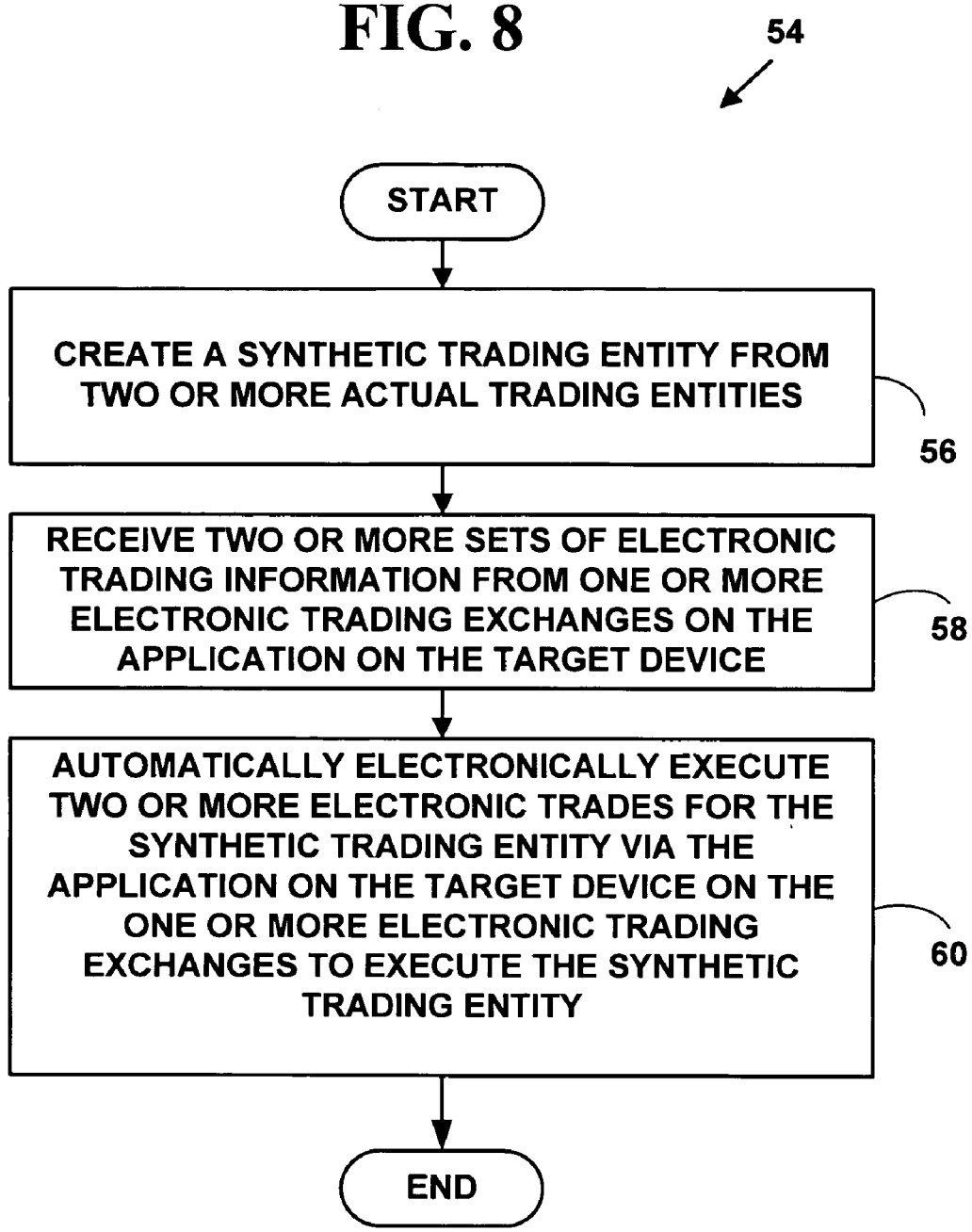
FIG. 8 is a flow diagram illustrating a method for automatically executing a synthetic trading entity.

FIG. 8 is a flow diagram illustrating a Method 54 for automatically executing a synthetic trading entity. At Step 56, a synthetic trading entity is created from two or more actual trading entities. At Step 58, two or more sets of electronic trading information are received from one or more electronic trading exchanges on the application 30 on the target device 12, 14, 16 including trading information for the two or more actual trading entities for the created synthetic trading entity. At Step 60, two or more electronic trades for the synthetic trading entity are automatically and electronically executed from via the application 30 on the target device 12, 14, 16 on the one or more electronic trading exchanges to execute the synthetic trading entity.

In one embodiment, Method 54 may further include Step 61 for displaying automatic electronic trading results for the synthetic trading entity via the application 30. In another embodiment, Method 54 may further include displaying automatic electronic trading results for the synthetic trading entity via the application on an Aggregated Book View (ABV) window 66.

Method 54 is illustrated with an exemplary embodiment. However, the invention is not limited to this embodiment and other embodiments can also be used to practice the invention.

In such an exemplary embodiment, At Step 56, a synthetic trading entity is created from two or more actual trading entities. In one embodiment, the synthetic trading entity includes a synthetic contract. In one embodiment, the synthetic contract includes a synthetic futures contract or a synthetic financial instrument contract, or a synthetic cash instrument contract. In one embodiment, the application 30 includes a multi-windowed application with a graphical user interface (GUI) displaying an Aggregated Book View (ABV) window 66 and/or an Order Ticket window 84 for one or more synthetic trading entities.

In one embodiment, Step 56 includes creating a synthetic trading entity including pre-determined electronic trading strategy created by an electronic strategy, If-Then trading strategies, one-cancels-other (OCO) trading strategies and electronic trading strategies for synthetic instruments or synthetic contracts or trading strategies based on previously executed electronic trades.

In one embodiment, Step 56 includes creating a synthetic trading entity with If-Then electronic trading strategy information that comprises upon receiving of an acknowledgement of an order fill: creating a profit/loss bracket around a fill price for a filled quantity; creating a stop or stop limit order at an offset from a fill price for the quantity of a fill; creating a trailing stop order at an offset from a fill price for a quantity of the fill; creating a limit order at an offset from a fill price for a quantity of the fill; or creating one or more one-cancels-other (OCO) order pairs.

In one embodiment, Step 56 includes creating a synthetic trading entity via a Synthetic Trading Entity window on the application 30. In one embodiment the Synthetic Trading Entity window is available from either the ABV window 66 or the Order Ticket window 84.

At Step 58, one or more sets of electronic trading information are received from one or more electronic trading exchanges on the application 30 on the target device 12, 14, 16 including trading information for the two or more actual trading entities for the created synthetic trading entity. In one embodiment, Step 58 further includes displaying the two or more sets of electronic information individually for the two or more actual trading entities comprising the synthetic trading entity. In another embodiment, Step 58 further includes combining, the two or more sets of electronic information for the synthetic trading entity and displaying electronic trading information for the synthetic trading entity via the application 30. In one embodiment, the synthetic trading entity is displayed by the application 30 on the ABV window 66.

At Step 60, two or more electronic trades for the synthetic trading entity are automatically and electronically executed from via the application 30 on the target device 12, 14, 16 on the one or more electronic trading exchanges to execute the synthetic trading entity.

Aggregated Book View (ABV) Window

The ABV Window allows the user to view bid size and offer size by price for a particular instrument in a market depth-type format. The window displays working orders for a selected account in a single instrument. The data on this window is displayed and updated in real-time. The window also allows the user to enter various order types. In one embodiment, two ABV widows are displayed by default. In another embodiment, one or more than two ABV windows are displayed by default.

Figure 9:
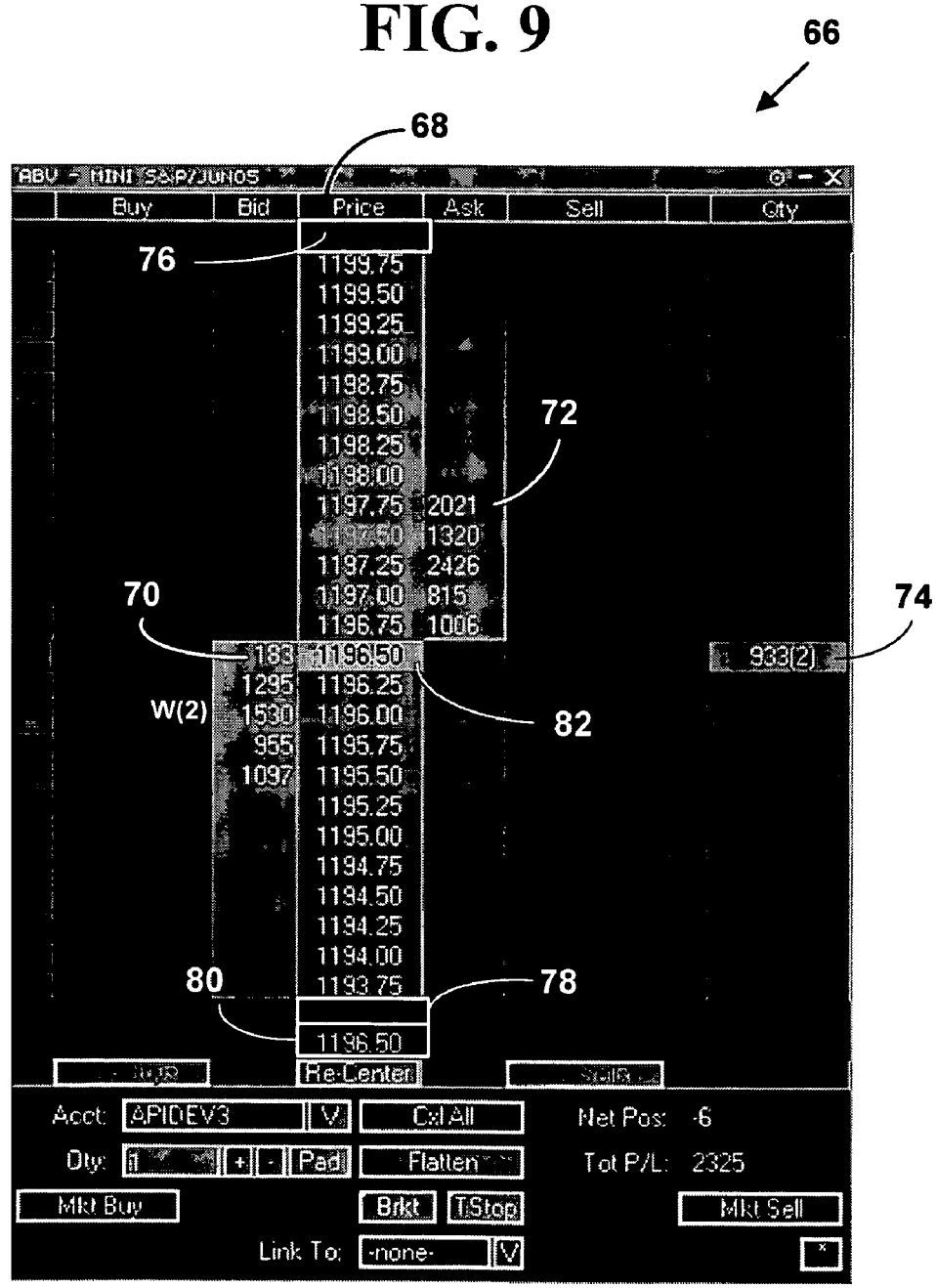
FIG. 9 is a block diagram of a screen shot of an exemplary ABV window.

FIG. 9 is a block diagram of screen shot of an exemplary ABV window 66 produced by application 30 displayed on GUI 32. The ABV window 66 includes a dynamically displayed Price column 68.

In one embodiment, the ABV window displays a buy column, a bid column, a dynamic price column, an ask column, a sell column, a quantity column, a re-center button, a cancel buy button, a cancel sell button, a cancel all button, a market buy button, a flatten button, a bracket button, a TStop button, a net position and a total P/L. However, the present invention is not limited to displaying these items and more, fewer or other items can be displayed in the ABV window 66 to practice the invention.

The user can select an instrument or contract to view in an ABV window 66, and can change the instrument or contract from this window 66. Changing the instrument or contract changes the data displayed to that of the selected instrument or contract. The user can select an account from available accounts. The window 66 displays the total quantity of orders working in the market at each price. Both buy and sell quantities are displayed. Quantities are updated as the instrument order book changes. The window 66 displays an indicator depicting the all of the user's open orders, for the selected account, at each price. The window 66 indicates a state of each order. Open order states include, but are not limited to: Queued, Sent, Working, Part Filled, Cancel Pending and Amend Pending, Held, Cancelled, Filled.

This window 66 indicates the order type for each order. The window 66 indicates the working quantity of each order. The window 66 displays parked orders for the selected instrument. The window 66 displays the user's net position in the selected instrument for the selected account. The window 66 displays the trade quantities for each corresponding price level. The user can select to view the total quantity currently trading at a price. This quantity is increased as each trade at a price occurs. The cumulative quantity remains in the window 66 until the price changes (at which time the cumulative trade quantity for the new price will be shown).

The user selects to view the last quantity currently trading at a price. This view shows the individual trade quantities. Only quantities for the current price are shown. The window 66 displays the total traded volume for the instrument. The window 66 displays all of the aforementioned data at once.

The user sets and adjusts the specified quantity for orders entered via this window 66. The quantity is set via a spinner, text entry or keypad entry. Each key-pad input increases a specified quantity by an amount displayed on the key (key value). The user selects to have the specified quantity set to zero after order entry. The user resets the quantity to zero (i.e., without entering an order). A right click on the mouse increases the quantity, left click decreases the quantity.

Orders entered via this window 66 will have a quantity equal to the quantity specified at time of entry. The default account for any orders entered from the ABV window 66 is the selected account. The can enter a limit order by clicking a cell in the bid quantity or offer quantity columns. Limit orders are default order type.

Order side will be set to BUY if the user clicks in the bid quantity column 70. Order side will be set to SELL if the user clicks in the offer quantity column 72. Orders will have a quantity equal to the specified quantity. Order limit price must equal the price corresponding to the clicked offer/bid quantity.

The user enters a stop order by clicking a cell in the bid or offer quantity columns 70, 72. Order side will be set to BUY if the user clicks in the bid quantity column 70. Order side will be set to SELL if the user clicks in the offer quantity column 72. Orders must have a quantity equal to the specified quantity. The order stop price will equal the price corresponding to the clicked offer/bid quantity. The order is entered for the selected account. The user is able to enter a buy stop below the market or a sell stop above the market. If the user does this, a window appears, warning the user that the buy or sell will be immediately executed.

The user can enter an OCO (One Cancels Other) pair of orders. The user can also enter a profit/loss bracket. The user can enter a trailing stop. The user can also enter an "If-Then Strategy."

The user can change the limit price of a working limit order by dragging the working order indicator to a new price. The user can change the stop price of a working stop order by dragging the working order indicator to a new price. This will cause a cancel replace to be entered at the electronic trading exchange 20, 22. The user can change the quantity of a working order by right clicking in the cell displaying the working order. A right click on a mouse displays a context menu listing order quantities centered on the current quantity. The user can also adjust account number.

The user can cancel a working order with a single mouse click. The user can cancel all open orders in the instrument for the selected account. The can cancel all open buy orders in the instrument for the selected account. The user can cancel all open sell orders in the instrument for the selected account.

Users can have orders at a price displayed as a concatenated total, or displayed as each individual order. When the display of individual orders is to large for the display, individual orders will be displayed starting with the first order entered and then the remaining orders that do not fit in the display will be concatenated. Concatenated orders are indicated as such using a symbol that is attached to the total. Users can also adjust the display of the ABV by adding or removing columns, buttons and functions.

The user uses the open position in the instrument for the selected account. This window 66 includes a Flatten button for flattening the net position. When the user chooses to flatten, all working orders for the instrument are canceled and an order is entered that flattens the net position (i.e., the quantity of the order will be equal to the net position and the order will be placed on the opposite side of the net position). The flattening is achieved with a single order (i.e., the user cannot enter more than one order to flatten).

The user can center the dynamic Price column 68 on the current market. The user can scroll the dynamic Price column 68 to display prices above or below the current market. All data is displayed real-time.

This ABV window 66 follows the standard window rules laid out in the Standard Window. The data in this window is displayed in a grid, but this grid will not follow all of the standard grid rules.

The user can choose from a list of columns to display. Certain columns will be displayed by default. Certain columns will not be removable (price for example). The user can change the order of the displayed columns by dragging a column heading to a new position. The user can manually resize a column. The user can resize all columns to fit the screen. The user can resize all columns to fit the contents. The user can resize a selected column to fit the contents. Double clicking on the column heading border sizes a column so that data only is displayed with no redundant space.

The user can change the font for all columns in the grid. The user can change the font for an individual column. The user can change the foreground color of a column. The user can change the background color of a column. The user can restore the default grid settings.

The ABV window 66 is resizable. When it is resized, the columns expand and contract so that all data is still shown. However, after resizing the window, the user can resize the columns to get rid of wasted space and then change the font size (i.e., so it's more readable when the screen is small).

This ABV window 66 will display the following fields illustrated in Table 1 in a ladder format. However, the present invention is not limited there fields and more, fewer or other types of fields can be used to practice the invention.

TABLE 1

Price
    Centered on the current market prices when launched.
Market Bid Quantity
Market Offer Quantity
Trade Quantity as determined in section 11.3 above
Open Buy Orders indicating status, type and quantity for each order
Open Sell Orders indicating status, type and quantity for each order
Parked Orders The ABV window 66 displays real-time data for a particular contract, allowing a user to get a current snapshot of the market. Thus, the ABV window 66 can also be considered an "Ask, Bid, Volume" window.

An instrument or contract can be added to an open ABV window 66 in the same way that a contract was added to the Quotes window 50. Simply select the contract that to display and then drag it into the ABV window 66. Contracts can be dragged from any of the windows displayed on the screen.

Once a contract has been added to the ABV window, the data illustrated in Table 2 is displayed on the ABV window.

TABLE 2

A current number of Bids 70 and Asks 72 on an electronic trading exchange 20, 22 for particular price levels.
A total quantity currently trading at a certain price.
A number in parentheses 74 next to the total quantity is the last quantity traded at that price.
A price in red is the daily high 76. A price shown in blue is the daily low 78. A last traded price is shown in gray 80.
The last traded price 82 is also highlighted on a dynamic price column 68. When there has been an uptick in this price, this cell will be green. When there has been a downtick, this cell will be red. If there has been no change, this cell will appear yellow.
The Buy and Sell columns display a total number of open orders at each particular price. For example, a "W2" in the Buy column indicates that there are working orders with a total quantity of two at the specified price.
Net Position and Total P/L on the ABV can be monitored by simply referring to the lower right hand corner of the window.

On the ABV window 66, the price of any open Buy or Sell orders can be amended. To change the price of an order, a row selector that corresponds with the order to amend is selected buy left-clicking and holding down a left mouse button, dragging a cursor connected to the mouse up or down to a desired new price and releasing the mouse button. A white cursor arrow appears to indicate a change in price. The price amended will be submitted as soon as the mouse is released. If there multiple orders at the same price (and on the same side), all of the orders will be amended to the new price when dragging the concatenated order. The user can cancel a signal order at a price where multiple orders exist. They can also modify a single order at a price where multiple orders exist. They do this by selecting the individual order and dragging and dropping.

Another feature of the ABV window 66 is that a desired position on the dynamically displayed Price column 68 can be moved. If it is desired to scroll up or down on a market price on the dynamically displayed Price column 68, the dynamically displayed Price column 66 is hovered over with a mouse. A yellow cursor arrow will appear, pointing up if the mouse cursor is in the top half of the dynamic price column 68, or down, if the mouse cursor is in the bottom half of the dynamic Price column 68. Clicking on the cursor arrow will scroll the grid in the direction that the arrow points.

The ABV window 66 provides a dynamic Price column 68 centered upon the lasted traded price that continuously changes with fluctuations in the last traded price. To enter an order, a mouse cursor is hovered anywhere in the ABV window 66. This mouse hover puts a user in the "order entry mode." In the order entry mode a trade near last traded price can be entered or prices on the dynamic price column can be manually adjusted away from the last traded price. To scroll up or down the market prices on the dynamic Price column 68 to enter a trade, the mouse cursor is hovered over the dynamic Price column 68. A large yellow arrow will appear, pointing up if the mouse curser is in the top half of the dynamic price column, or down, the mouse cursor is in the bottom half of the dynamic price column. Clicking on the large yellow arrow will scroll the prices in the dynamic price column in the direction that the large arrow points so a trade can be entered away from a current market price.

If the dynamic Price column 68 is scrolled up or down and the last traded price is not centered on your ABV, the dynamic price column will start to scroll until the last traded price is again centered in the ABV window 66. In addition, if there is no further activity from a mouse for a period of time the dynamic Price column 68 will also start to scroll. As a visual indication, just before the dynamic price column begins to scroll, the mouse cursor will turn yellow and start to flash. This is a warning that the ABV window is about to begin re-centering around the last traded price. If, at any time, the mouse cursor is moved out of the ABV window, you leave the order entry mode and the ABV will automatically re-center the dynamic price column on the last traded price the next time the market price changes.

Stop and limit orders can also be entered on the ABV window 66 with just a click of a mouse. Before entering limit or stop orders an account is chosen and a quantity is entered. If a user has access to multiple accounts, the user can select the desired account by using the Account drop down menu. The user can input a number of lots to trade by typing the number in, by using the + or − buttons, or by using a keypad. A default quantity can be set via the Settings window. After selecting an account and quantity, limit and stop orders can be placed.

To enter a Buy Limit order, the mouse is clicked in the Bid column next to the Price to enter the order for. A limit order to buy will be entered at that price for the quantity specified, and a new working order will be reflected in the Buy column. Likewise, to enter a Sell Limit order, the mouse is clicked in the Ask column next to the Price to enter the order for.

To enter a Buy Stop order, the mouse is right-clicked in the Bid column next to the Price to enter the order for. A stop order to buy will be entered at that price for the quantity specified, and a new order will be reflected in the Buy column. Similarly, to enter a Sell Stop order, the mouse is right-clicked in the Ask column next to the Price that you want to enter the order for.

In addition to Limit and Stop orders, Market orders can be executed on the ABV window 66 using the Market Buy and Market Sell buttons. The ABV window can also be set up so that a Bracket or Trailing Stop order will automatically be created any time an order entered via the ABV is filled. The Bracket and Trailing Stop parameters will default to the values set up on the Settings window. To link a Bracket or Trailing Stop order to all orders entered via the ABV, choose Bracket or TStop from the Link To drop down box. A small window pops up with the default parameters for a bracket. The bracket levels can be changed by typing in a desired number, or using the "+" and "−" buttons. A limit order will be the profit order type, and for a loss order type, either choose a stop or a trailing stop can be selected.

For example, if a stop order is chosen, as soon as the order was filled, two new orders were entered. A limit order was created at a price that is five ticks above the market order's price and a stop order was created at a price that is three ticks below the market order's price. Both orders have the same quantity that the market order had. Because these orders were entered as part of a bracket, when one of these orders is filled, the other will automatically be cancelled. Likewise, TStop is chosen from the Link To drop down box, a small window will appear that allows you to view and change trailing stop parameters. Like the bracket, a trailing stop will be entered once an order entered via the ABV window 66 is filled.

The ABV also allows cancellation of some or all of working orders as well. To cancel a particular order, the mouse cursor is placed over that order in the Buy or Sell column, whichever applies, and a yellow X appears over the working order. A mouse click on the yellow X will cancel that particular order. If multiple orders are entered at the same price (and on the same side), they will all be cancelled.

Order Ticket Window

Figure 10:
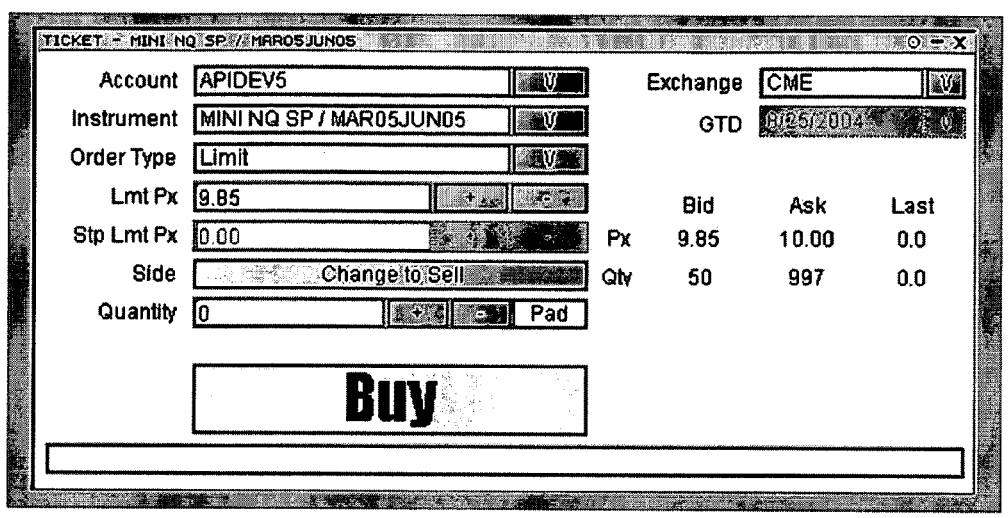
FIG. 10 is a block diagram of screen shot of an exemplary order ticket window.

FIG. 10 is a block diagram of screen shot of an exemplary Order Ticket window 84 produced by application 30 and displayed on GUI 32. This window 84 allows the user to create and enter all types of orders supported by the application and the APIs used. Multiple order tickets can be launched and multiple Order Ticket windows 84 will be created. Order types, including Synthetic order types can be entered from this window. If necessary, the Order Ticket window will change or launch supporting dialogs to accommodate complex actual or synthetic order types.

The user can select the account that the order applies to. The user can change the side of the order. The ticket background color depends upon the side chosen. For example, the background is set to blue for buy orders and set to red for sell orders. The following market data is displayed, but is not limited to, on this window 84 for the selected instrument: bid price, bid size, ask price, ask size, and last traded price.

The window 84 can also be resized. The user can select to have the order ticket always on top. This window 84 is comprised of all the fields necessary to enter an order for an actual or synthetic entity.

Table 3 illustrate a list of the fields that are use to create a standard order. Synthetic orders also created directly from this window 84. In another embodiment, a separate window may be launched, or there may be some other method of accessing synthetic order entry. However, the present invention is not limited to this order information and more, fewer or other types of order information can be used to practice the invention.

TABLE 3

Exchange
    The default value for this field is determined from the window where it was launched or in Settings.
Instrument
    This field is filtered to display valid instruments based on the exchange that is selected.
Contract Date
    This field is filtered to display valid contract dates based on the instrument that is selected.
Order Type
    This field is filtered to display valid order types based on the exchange that is selected.
Limit Price
    This field defaults to either the current bid, ask or last as determined by Settings and by the side.
    This price does not change once the order is open.
    This field is enabled only for stop, stop limit, MIT orders and the synthetic equivalents for those order types.
    The use is able to enter the price via keyboard entry or spinner,
Order Quantity
    The user is able to change the specified order quantity through a key-pad control.
    Each key-pad input increases the specified quantity by the amount displayed on the key (the key value).
    The user has ability to set the quantity back to zero.
    The user is able to select to have the specified quantity set to zero after order entry.
Secondary Price
    This field is enabled only for stop limit orders.
Good-Till-Date
    This field is enabled only for orders with TIF (Time in Force) of GTD.
    This field defaults to the current trade date.

Synthetic Entity Input Window

Figure 11:
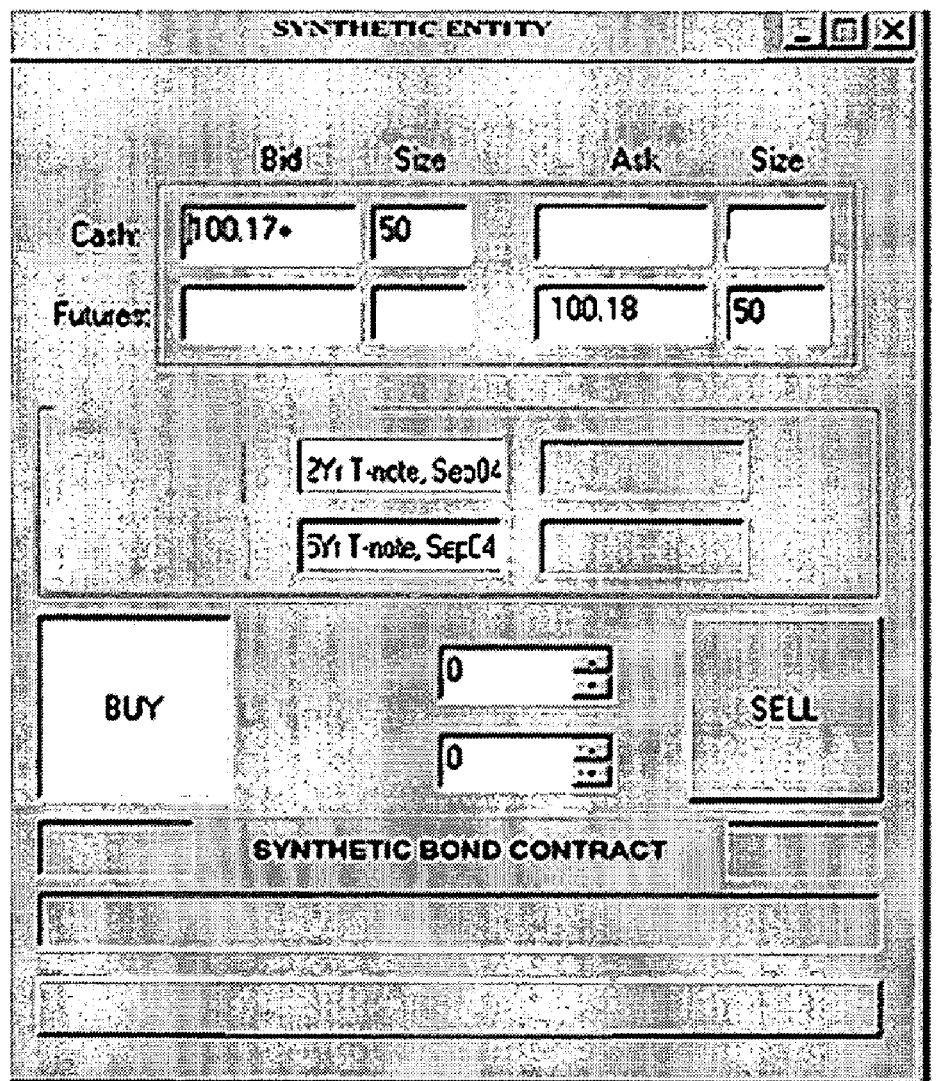
FIG. 11 is a block diagram of a screen shot of an exemplary synthetic entity input window.

FIG. 11 is a block diagram of a screen shot of an exemplary synthetic entity input window 86. This exemplary synthetic entity input window 86 includes a window for creating a synthetic entity with two or more actual futures and cash contracts. However, the present invention is not limited to this exemplary synthetic entity input window 86 and other synthetic entity input windows with more fewer or other information can also be used to practice the invention.

Automatically Displaying Synthetic Trading Entities

Figure 12:
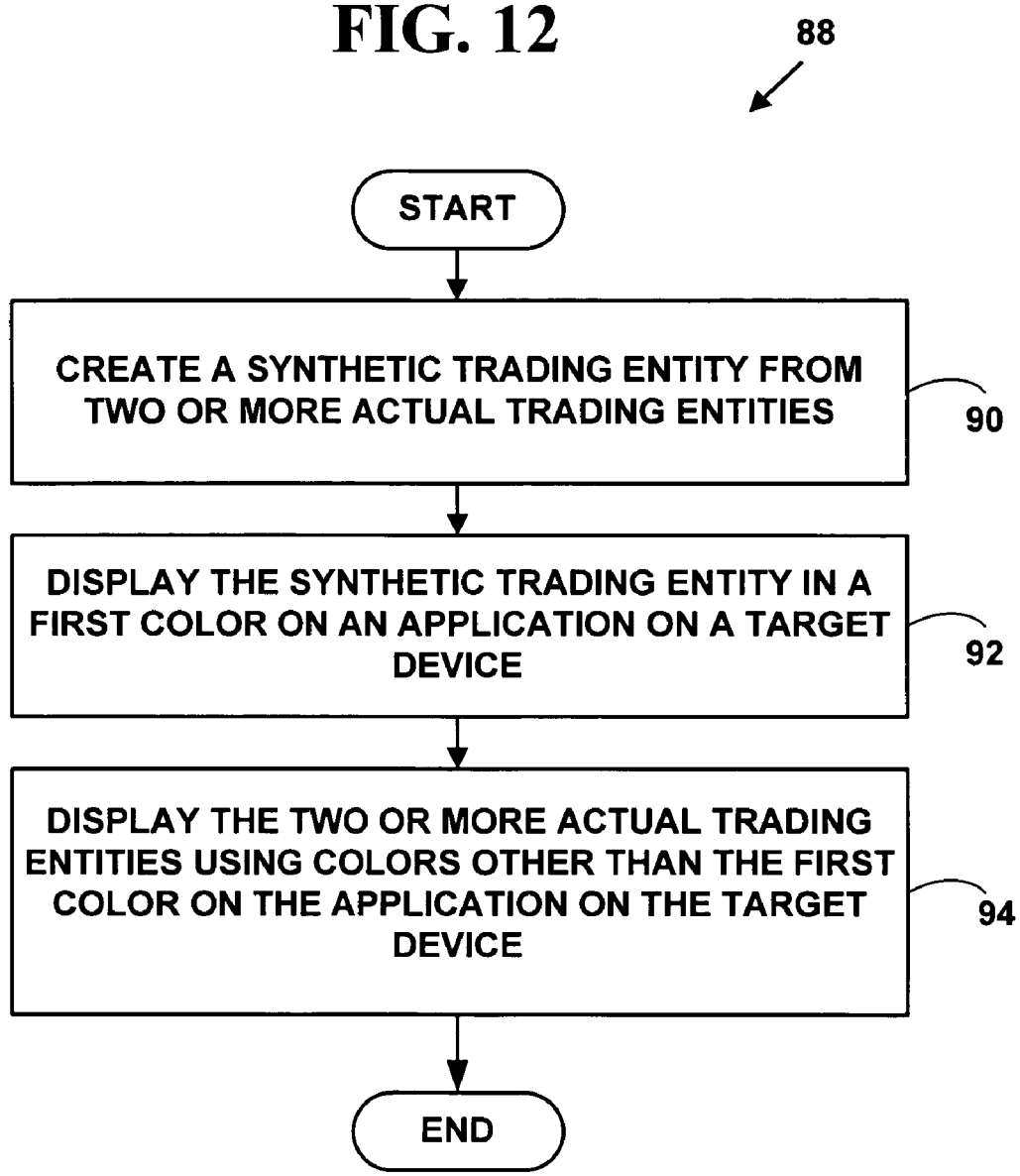
FIG. 12 is a flow diagram illustrating a method for automatically viewing a synthetic trading entity.

FIG. 12 is a flow diagram illustrating a Method 88 for automatically displaying a synthetic trading entity. At Step 90, a synthetic trading entity is created from two or more actual trading entities. At Step 92, the created synthetic trading entity is displayed with a first color via an application 30 on a target device 12, 14, 16. At Step 94, two or more actual trading entities are displayed in colors other than the first color via the application 30 on the target device 12, 14, 16.

Method 88 is illustrated with an exemplary embodiment. However, the invention is not limited to this embodiment and other embodiments can also be used to practice the invention.

In such an exemplary embodiment At Step 90, a synthetic trading entity is created from two or more actual trading entities as was described above for Method 54.

At Step 92, the created synthetic trading entity is displayed with a first color the application 30 on the target device 12, 14, 16. For example, created synthetic trading entities may be displayed with a purple color to distinguish the synthetic trading entity for the actual trading entities. However, the present invention is not limited to such an embodiment and other embodiment can also be used to practice the invention.

In one embodiment, the synthetic trading entity is displayed via the application 30 via the ABV window 66 or the Order Ticket Window 84 with the first color. In one embodiment, Step 92 further includes: receiving a selection input for the created synthetic trading entity and displaying the two or more actual trading entities used to create the synthetic trading entity via the application 30 on the target device 12, 14, 16.

At Step 94, two or more actual trading entities are displayed in colors other than the first color via the application 30 on the target device 12, 14, 16.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

We claim:

1. A method for automatically executing a synthetic trading entity, comprising:

creating a synthetic trading entity from two or more actual trading entities via a graphical synthetic entity input window on an application on a target device with one or more processors, wherein the graphical synthetic entity input window creates the synthetic trading entity for displaying in a plurality of other graphical windows, wherein the synthetic trading entity is selectable in the plurality of other graphical windows and wherein selecting the synthetic trading entity from a graphical window displays the two or more actual trading entities used to create the synthetic trading entity;

receiving two or more sets of electronic trading information from one or more electronic trading exchanges on the application on the target device including electronic trading information for the two or more actual trading entities for the created synthetic trading entity;

automatically and electronically executing two or more electronic trades for the synthetic trading entity via the application on the target device on the one or more electronic trading exchanges by selecting at least one of a plurality of graphical buttons; and displaying the synthetic trading entity and electronic trading information for the synthetic trading entity and the two or more actual trading entities used to create the synthetic trading entity on a graphical Aggregated Book View (ABV) window on the application, wherein the ABV window includes a dynamically displayed price column and wherein the ABV window displays bid size and offer size by price for the synthetic trading entity and the two or more actual trading entities in a market depth-type format, wherein the ABV window provides a dynamic price column centered upon a current lasted traded price for the synthetic trading entity and wherein the ABV window displays a plurality of other graphical columns including a buy column, a bid column, an ask column, a sell column, a quantity column, a net position column and a total profit and loss column and a plurality of graphical buttons including a re-center button, a cancel buy button, a cancel sell button, a cancel all button, a market buy button, a flatten button, a bracket button and a TStop button, wherein the plurality of graphical columns provide visual trading information and the plurality of graphical buttons provide trading functionality for automatically and electronically executing two or more electronic trades for the synthetic trading entity via the application on the target device on the one or more electronic trading exchanges; and automatically and dynamically re-centering the dynamic price column in the ABV window upon a current last traded price that continuously and dynamically changes with price fluctuations in the current last traded price for the synthetic trading entity.

2. A computer readable medium have stored therein computer-executable instructions for causing an application on a target device with one or more processors to execute the steps of:

creating a synthetic trading entity from two or more actual trading entities via a graphical synthetic entity input window on an application on a target device with one or more processors, wherein the graphical synthetic entity input window creates the synthetic trading entity for displaying in a plurality of other graphical windows, wherein the synthetic trading entity is selectable in the plurality of other graphical windows and wherein selecting the synthetic trading entity from a graphical window displays the two or more actual trading entities used to create the synthetic trading entity;

receiving two or more sets of electronic trading information from one or more electronic trading exchanges on the application on the target device including electronic trading information for the two or more actual trading entities for the created synthetic trading entity;

automatically and electronically executing two or more electronic trades for the synthetic trading entity via the application on the target device on the one or more electronic trading exchanges; and displaying the synthetic trading entity and electronic trading information for the synthetic trading entity and the two or more actual trading entities used to create the synthetic trading entity on a graphical Aggregated Book View (ABV) window on the application, wherein the ABV window includes a dynamically displayed price column and wherein the ABV window displays bid size and offer size by price for the synthetic trading entity and the two or more actual trading entities in a market depth-type format, wherein the ABV window provides a dynamic price column centered upon a current lasted traded price for the synthetic trading entity and wherein the ABV window displays a plurality of other graphical columns including a buy column, a bid column, an ask column, a sell column, a quantity column, a net position column and a total profit and loss column and a plurality of graphical buttons including a re-center button, a cancel buy button, a cancel sell button, a cancel all button, a market buy button, a flatten button, a bracket button and a TStop button, wherein the plurality of graphical columns provide visual trading information and the plurality of graphical buttons provide trading functionality for automatically and electronically executing two or more electronic trades for the synthetic trading entity via the application on the target device on the one or more electronic trading exchanges; and automatically and dynamically re-centering the dynamic price column in the ABV window upon a current last traded price that continuously and dynamically changes with price fluctuations in the current last traded price for the synthetic trading entity.

3. The method of claim 1 wherein the synthetic trading entity includes a synthetic contract or a synthetic financial instrument.

4. The method of claim 1 wherein the synthetic contract includes a synthetic futures contract, a synthetic financial instrument contract or a synthetic cash instrument contract.

5. The method of claim 1 wherein the Aggregated Book View window is also a window for displaying "Ask, Bid, Volume" information for actual trading entities and synthetic trading entities.

6. The method of claim 1 further comprising displaying automatic electronic trading results for the synthetic trading entity via the application on an Order Ticket window, wherein the Order Ticket window displays a bid price, bid size, ask price, ask size, and last traded price for actual and synthetic trading entities.

7. The method of claim 1 wherein the step of creating a synthetic trading entity comprises creating a synthetic trading entity including a pre-determined electronic trading strategy, an If-Then trading strategy, a one-cancels-other (OCO) trading strategies or a trading strategy based on previously executed electronic trades.

8. The method of claim 1 wherein the step of creating a synthetic trading entity includes an If-Then electronic trading strategy information that comprises upon receiving of an acknowledgement of an order fill: creating a profit/loss bracket around a fill price for a filled quantity; creating a stop or stop limit order at an offset from a fill price for the quantity of a fill; creating a trailing stop order at an offset from a fill price for a quantity of the fill; creating a limit order at an offset from a fill price for a quantity of the fill; or creating one or more one-cancels-other (OCO) order pairs.

9. The method of claim 1 further comprising:

displaying the created synthetic trading entity with a first color on the application on the graphical Ask Bid Volume (ABV) window on the target device; and displaying the two or more actual trading entities in colors other than the first color via the application on the target device on the graphical ABV window on the application, wherein the ABV window includes a dynamically displayed price column and wherein the ABV window displays bid size and offer size by price for the synthetic trading entity and the two or more actual trading entities in a market depth-type format, wherein the ABV window provides a dynamic price column centered upon a current lasted traded price for the synthetic trading entity; and automatically and dynamically re-centering the dynamic price column in the ABV window upon a current last traded price that continuously and dynamically changes with price fluctuations in the current last traded price for the synthetic trading entity.

10. The method of claim 9 wherein the synthetic trading entity includes a synthetic contract.

11. The method of claim 9 wherein the synthetic contract includes a synthetic futures contract, a synthetic financial instrument contract or a synthetic cash instrument contract.

12. The method of claim 9 wherein the step of displaying the created synthetic trading entity with a first color includes displaying the synthetic trading entity with the first color via the application on an Order Ticket window, wherein the Order Ticket window displays a bid price, bid size, ask price, ask size, and last traded price for actual and synthetic trading entities.

13. The method of claim 9 wherein the step of displaying the created synthetic trading entity with a first color further includes:

receiving a selection input for the created synthetic trading entity; and displaying the two or more actual trading entities used to create the synthetic trading entity via the application in other than the first color on the ABV window.

14. The method of claim 9 wherein the step of creating a synthetic trading entity includes creating a synthetic trading entity including a pre-determined electronic trading strategy, an If-Then trading strategy, a one-cancels-other (OCO) trading strategies or a trading strategy based on previously executed electronic trades.

15. A synthetic trading entity system, comprising in combination:

means for creating a synthetic trading entity from two or more actual trading entities via graphical synthetic entity input window on an application on a target device with one or more processors, wherein the graphical synthetic entity input window creates the synthetic trading entity for displaying in a plurality of other graphical windows, wherein the synthetic trading entity is selectable in the plurality of other graphical windows and wherein selecting the synthetic trading entity from a graphical window displays the two or more actual trading entities used to create the synthetic trading entity;

means for receiving two or more sets of electronic trading information from one or more electronic trading exchanges on the application on the target device including trading information for the two or more actual trading entities for the created synthetic trading entity;

means for automatically and electronically executing two or more electronic trades for the synthetic trading entity via the application on the target device on the one or more electronic trading exchanges; and means for displaying the synthetic trading entity and electronic trading information for the synthetic trading entity and the two or more actual trading entities used to create the synthetic trading entity on a graphical Aggregated Book View (ABV) window on the application, wherein the ABV window includes a dynamically displayed price column and wherein the ABV window displays bid size and offer size by price for the synthetic trading entity and the two or more in a market depth-type format, wherein the ABV window provides a dynamic price column centered upon a current lasted traded price for the synthetic trading entity, wherein the ABV window displays a plurality of other graphical columns including a buy column, a bid column, an ask column, a sell column, a quantity column, a net position column and a total profit and loss column and a plurality of graphical buttons including a re-center button, a cancel buy button, a cancel sell button, a cancel all button, a market buy button, a flatten button, a bracket button and a TStop button, wherein the plurality of graphical columns provide visual trading information and the plurality of graphical buttons provide trading functionality for automatically and electronically executing two or more electronic trades for the synthetic trading entity via the application on the target device on the one or more electronic trading exchanges; and means for automatically and dynamically re-centering the dynamic price column in the ABV window upon a current last traded price that continuously and dynamically changes with price fluctuations in the current last traded price for the synthetic trading entity.

16. The synthetic trading entity system of claim 15 further comprising:

means for displaying the created synthetic trading entity with a first color via the application on the target device on the ABV window; and means for displaying the two or more actual trading entities in colors other than the first color via the application on the target device on the ABV window.

* * * * *